United States Patent
Omiya et al.

(10) Patent No.: US 9,255,514 B2
(45) Date of Patent: Feb. 9, 2016

(54) HONEYCOMB STRUCTURE

(71) Applicant: NGK Insulators, Ltd., Nagoya (JP)

(72) Inventors: Yoshimasa Omiya, Nagoya (JP); Atsushi Kaneda, Nagoya (JP); Kazumi Mase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 29 days.

(21) Appl. No.: 14/224,670

(22) Filed: Mar. 25, 2014

(65) Prior Publication Data

US 2014/0294690 A1   Oct. 2, 2014

(30) Foreign Application Priority Data

Mar. 29, 2013 (JP) ................................ 2013-074936

(51) Int. Cl.
| | |
|---|---|
| *B01D 50/00* | (2006.01) |
| *B01D 39/14* | (2006.01) |
| *B01D 39/06* | (2006.01) |
| *B01D 39/20* | (2006.01) |
| *B01D 24/00* | (2006.01) |
| *F01N 3/28* | (2006.01) |
| *C04B 35/565* | (2006.01) |
| *C04B 37/00* | (2006.01) |

(Continued)

(52) U.S. Cl.
CPC .......... *F01N 3/2803* (2013.01); *B01D 46/2425* (2013.01); *B01D 46/2448* (2013.01); *C04B 35/565* (2013.01); *C04B 37/005* (2013.01); *C04B 38/0019* (2013.01); *F01N 3/2026* (2013.01); *F01N 3/2828* (2013.01); *F01N 2330/06* (2013.01)

(58) Field of Classification Search
CPC .... F01N 3/0222; F01N 3/027; B01D 46/0063
See application file for complete search history.

(56) References Cited

U.S. PATENT DOCUMENTS 5,733,352 A * 3/1998 Ogawa et al. .................. 55/523
8,506,894 B2 * 8/2013 Ido et al. ....................... 422/174

(Continued)

FOREIGN PATENT DOCUMENTS

| EP | 2 554 265 A1 | 2/2013 |
|---|---|---|
| EP | 2 784 049 A2 | 10/2014 |

(Continued)

OTHER PUBLICATIONS

Extended European Search Report (Application No. 14162314.0) dated Mar. 5, 2015.

*Primary Examiner* — Amber R Orlando
(74) *Attorney, Agent, or Firm* — Burr & Brown, PLLC

(57) ABSTRACT

A honeycomb structure includes a tubular bonded honeycomb segment assembly having a plurality of honeycomb segments and a bonding layer which bonds side surfaces of the plurality of honeycomb segments to each other; and a pair of electrode members disposed on a side surface of the bonded honeycomb segment assembly, a volume resistivity of each of the honeycomb segments is from 1 to 200 Ωcm, at least a part of the bonding layer is made of a bonding material having a conductivity, a volume resistivity of the bonding layer is from 2 to 2000 Ωcm, and each of the pair of electrode members is formed into a band-like shape extending in an extending direction of the cells of the bonded honeycomb segment assembly, and one electrode member is disposed on a side opposite to the other electrode member via a center of the bonded honeycomb segment assembly.

12 Claims, 5 Drawing Sheets

(51) Int. Cl.
*C04B 38/00* (2006.01)
*B01D 46/24* (2006.01)
*F01N 3/20* (2006.01)

(56) References Cited

U.S. PATENT DOCUMENTS

| | | | | |
|---|---|---|---|---|
| 8,685,885 | B2* | 4/2014 | Tamura et al. | 502/439 |
| 8,715,579 | B2* | 5/2014 | Ido et al. | 422/174 |
| 8,907,256 | B2* | 12/2014 | Hashimoto et al. | 219/553 |
| 9,023,453 | B2* | 5/2015 | Ido et al. | 428/116 |
| 2004/0118095 | A1* | 6/2004 | Chikawa et al. | 55/523 |
| 2006/0228520 | A1* | 10/2006 | Masukawa et al. | 428/116 |
| 2006/0292337 | A1* | 12/2006 | Ohno et al. | 428/116 |
| 2006/0292338 | A1* | 12/2006 | Ohno et al. | 428/116 |
| 2007/0092692 | A1* | 4/2007 | Masukawa et al. | 428/116 |
| 2009/0022943 | A1* | 1/2009 | Tomita et al. | 428/116 |
| 2009/0220735 | A1* | 9/2009 | Mizuno et al. | 428/116 |
| 2010/0203284 | A1* | 8/2010 | Kanai | 428/116 |
| 2011/0250094 | A1* | 10/2011 | Ido et al. | 422/168 |
| 2012/0076698 | A1* | 3/2012 | Ishihara | 422/174 |
| 2012/0248090 | A1* | 10/2012 | Furukawa et al. | 219/538 |

FOREIGN PATENT DOCUMENTS

| | | |
|---|---|---|
| JP | 2011-098866 A1 | 5/2011 |
| JP | 2012-031738 A1 | 2/2012 |
| JP | 2012-188958 A1 | 10/2012 |

* cited by examiner

US 9,255,514 B2

HONEYCOMB STRUCTURE

The present application is an application based on JP-2013-074936 filed on Mar. 29, 2013 with the Japanese Patent Office, the entire contents of which are incorporated herein by reference.

BACKGROUND OF THE INVENTION

1. Field of the Invention

The present invention relates to a honeycomb structure. More particularly, it relates to a honeycomb structure which can be used as a catalyst carrier and also functions as a heater when a voltage is applied thereto and further, which has excellent heat shock resisting properties.

2. Description of Related Art

Heretofore, a product in which a catalyst is loaded onto a honeycomb structure made of cordierite has been used for a treatment of harmful substances in an exhaust gas discharged from a car engine. Furthermore, a honeycomb structure formed from a sintered silicon carbide body has been used for purification of the exhaust gas.

When the exhaust gas is treated by the catalyst loaded onto the honeycomb structure, it is necessary to raise a temperature of the catalyst to a predetermined temperature. However, the catalyst temperature is low at start of the engine, which has caused a problem that the exhaust gas is not sufficiently purified.

Consequently, there has been investigated a catalyst converter including a catalyst carrier to be heated by energization and electrodes, and the catalyst carrier is formed from a plurality of segments arranged in a direction perpendicular to a straight line connecting centers of each electrode to each other (e.g., see Patent Document 1). In the catalyst converter, volume resistivities of the plurality of segments are varied, respectively, whereby an amount of heat to be generated by the energization is approximate to a uniform amount.

Furthermore, there has been suggested a honeycomb structure body including a plurality of sintered conductive segment portions each having a honeycomb structure, and a sintered bonding material portion which bonds the sintered conductive segment portions to one another (e.g., see Patent Document 2).

[Patent Document 1] JP-A-2012-188958
[Patent Document 2] JP-A-2011-98866

SUMMARY OF THE INVENTION

In the catalyst converter described in Patent Document 1, it is necessary to vary volume resistivities of a plurality of segments, respectively, and hence a load on production tends to be large.

It is described in Patent Document 2 that sintered segment portions and a sintered bonding material portion are conductive, but specific conditions of a volume resistivity and the like are not described. Usually, various problems and the like are present in conditions and the like for each use application, which has caused a problem that implementation is difficult.

The present invention has been developed in view of the above-mentioned problems, and an object thereof is to provide a honeycomb structure which can be used as a catalyst carrier and also suitably functions as a heater when a voltage is applied thereto and further, which has excellent heat shock resisting properties.

To solve the above-mentioned problems, according to the present invention, there is provided a honeycomb structure in the following.

According to a first aspect of the present invention, a honeycomb structure including a tubular bonded honeycomb segment assembly having a plurality of tubular honeycomb segments having porous partition walls to define and form a plurality of cells which become through channels for a fluid and extend from one end surface to the other end surface is provided, and also having a bonding layer which bonds side surfaces of the plurality of honeycomb segments to each other; and a pair of electrode members disposed on a side surface of the bonded honeycomb segment assembly, wherein a volume resistivity of each of the honeycomb segments of the bonded honeycomb segment assembly is from 1 to 200 $\Omega$cm, at least a part of the bonding layer is made of a bonding material having a conductivity, a volume resistivity of the bonding layer having the conductivity is from 2 to 2000 $\Omega$cm, and each of the pair of electrode members is formed into a band-like shape extending in an extending direction of the cells of the bonded honeycomb segment assembly, and in a cross section perpendicular to the cell extending direction, one electrode member in the pair of electrode members is disposed on a side opposite to the other electrode member in the pair of electrode members via a center of the bonded honeycomb segment assembly.

According to a second aspect of the present invention, the honeycomb structure according to the above first aspect is provided, wherein when the volume resistivity of the bonding layer having the conductivity is $\rho jo$, an open frontal area ratio of the honeycomb segment is OFA, the volume resistivity of the honeycomb segment is $\rho A$ and a numeric value calculated in accordance with a formula of $\rho A/(1-OFA/100)$ is Rjo, a value of $\rho jo/Rjo$ as a value of a ratio of the $\rho jo$ to the Rjo is from 0.2 to 3.0.

According to a third aspect of the present invention, the honeycomb structure according to the above first or second aspects is provided, wherein a porosity of the bonding layer is from 30 to 70%.

According to a fourth aspect of the present invention, the honeycomb structure according to any one of the above first to third aspects is provided, wherein in the cross section perpendicular to the cell extending direction, the bonding layer has a both-end contact linear portion as a linear portion in which one end portion comes in contact with the one electrode member and the other end portion comes in contact with the other electrode member, and a resistance value between both the end portions in the both-end contact linear portion is larger than a resistance value of the honeycomb segment.

According to a fifth aspect of the present invention, the honeycomb structure according to any one of the above first to fourth aspects is provided, wherein in the cross section perpendicular to the cell extending direction, the bonding layer has a one-end contact linear portion as a linear portion in which both end portions are positioned in an outer periphery of the bonded honeycomb segment assembly and only one end portion comes in contact with the electrode member, and a resistance value between both the end portions in the one-end contact linear portion is larger than a resistance value of the honeycomb segment.

According to a sixth aspect of the present invention, the honeycomb structure according to any one of the above first to fifth aspects of the present invention, wherein in the cross section perpendicular to the cell extending direction, the bonding layer has a non-contact vertical linear portion as a linear portion in which both end portions are positioned in an outer periphery of the bonded honeycomb segment assembly and do not come in contact with the electrode members and which does not intersect with a line segment connecting centers of the pair of electrode members to each other, and a resistance value between both the end portions in the non-contact vertical linear portion is larger than a resistance value of the honeycomb segment.

According to a seventh aspect of the present invention, the honeycomb structure according to any one of the above first to sixth aspects is provided, wherein in the cross section perpendicular to the cell extending direction, the bonding layer has a non-contact transverse linear portion as a linear portion in which both end portions are positioned in an outer periphery of the bonded honeycomb segment assembly and do not come in contact with the electrode members and which intersects with a line segment connecting centers of the pair of electrode members to each other, and a resistance value between both the end portions in the non-contact transverse linear portion is smaller than a resistance value of the honeycomb segment.

According to an eighth aspect of the present invention, the honeycomb structure according to any one of the above first to seventh aspects is provided, wherein a material of the honeycomb segment contains a silicon-silicon carbide composite material as a main component, an average particle diameter of silicon carbide in the honeycomb segment is from 3 to 50 μm, a porosity of the partition walls of the honeycomb segment is from 35 to 60%, and a content ratio of silicon in the honeycomb segment is from 10 to 40 mass % of a total mass of silicon and silicon carbide in the honeycomb segment.

A honeycomb structure of the present invention includes a bonded honeycomb segment assembly in which a plurality of honeycomb segments are bonded via a conductive bonding layer, and a pair of electrode members. Therefore, the honeycomb structure of the present invention has excellent heat shock resisting properties. Furthermore, in the honeycomb structure of the present invention, a volume resistivity of each of the honeycomb segments is from 1 to 200 Ωcm, and a volume resistivity of the bonding layer is from 2 to 2000 Ωcm. Therefore, the honeycomb structure of the present invention can be used as a catalyst carrier, and also suitably functions as a heater when a voltage is applied thereto.

Furthermore, in the honeycomb structure of the present invention, each of the pair of electrode members is formed into a band-like shape extending in a cell extending direction of the bonded honeycomb segment assembly. Furthermore, in a cross section perpendicular to the cell extending direction, one electrode member in the pair of electrode members is disposed on a side opposite to the other electrode member in the pair of electrode members via a center of the bonded honeycomb segment assembly. Therefore, it is possible to inhibit an unevenness of a temperature distribution when the voltage is applied to the honeycomb structure.

DETAILED DESCRIPTION OF THE INVENTION

Figure 1:
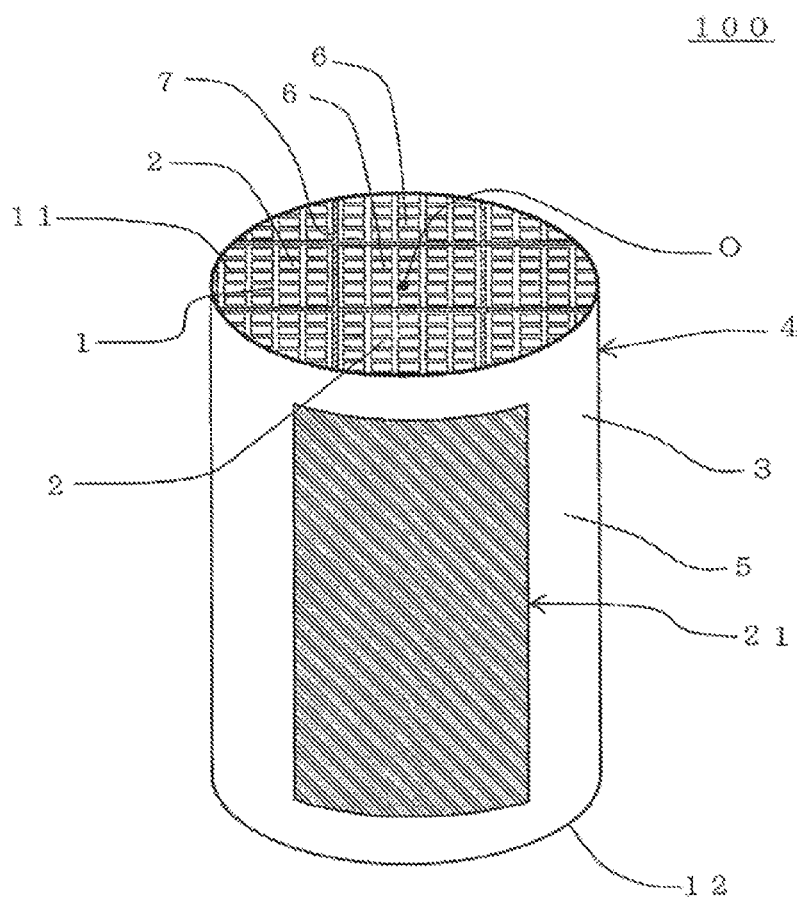
FIG. 1 is a perspective view schematically showing one embodiment of a honeycomb structure of the present invention.

Next, modes for carrying out the present invention will be described in detail with reference to the drawings. It should be understood that the present invention is not limited to the following embodiments and that changes, improvements and the like of design can suitably be added on the basis of ordinary knowledge of a person skilled in the art without departing from the gist of the present invention.

(1) Honeycomb Structure:

As shown in FIG. 1 to FIG. 5, one embodiment of a honeycomb structure of the present invention includes a tubular bonded honeycomb segment assembly 4 and a pair of electrode members 21, 21 disposed on a side surface 5 of the bonded honeycomb segment assembly 4. Furthermore, the tubular bonded honeycomb segment assembly 4 has a plurality of tubular honeycomb segments 6, and a bonding layer 7 which bonds side surfaces of the plurality of honeycomb segments 6 to each other. Furthermore, the tubular honeycomb segments 6 have porous partition walls 1 to define and form a plurality of cells 2 which become through channels for a fluid and extend from one end surface 11 to the other end surface 12. Furthermore, a volume resistivity of each of the honeycomb segments 6 of the bonded honeycomb segment assembly 4 is from 1 to 200 Ωcm. Furthermore, "at least a part of the bonding layer 7" is made of a bonding material having a conductivity. Furthermore, a volume resistivity of the bonding layer 7 having the conductivity is from 2 to 2000 Ωcm. Furthermore, each of the pair of electrode members 21, 21 is formed into a band-like shape extending in an extending direction of the cells 2 of the bonded honeycomb segment assembly 4. Furthermore, in a cross section perpendicular to the extending direction of the cells 2, one electrode member 21 in the pair of electrode members 21, 21 is disposed on a side opposite to the other electrode member 21 in the pair of electrode members 21, 21 via a center O of the bonded honeycomb segment assembly 4.

In a honeycomb structure 100 of the present embodiment, the volume resistivity of each of the honeycomb segments 6 of the bonded honeycomb segment assembly 4 is from 1 to 200 Ωcm. Therefore, the honeycomb structure 100 generates heat by energization. Furthermore, in the honeycomb structure 100, at least a part of the bonding layer 7 which bonds the honeycomb segments 6 together is made of "the bonding material having the conductivity". As described above, the honeycomb structure 100 is not integrally formed of a honeycomb structure region as a substantial heat generation body, but is constituted of the bonded honeycomb segment assembly 4 in which the plurality of honeycomb segments 6 are bonded by the conductive bonding layer 7. Therefore, the bonding layer 7 can buffer stress generated in the bonded honeycomb segment assembly 4. For example, it is possible to inhibit large stress from being applied to the bonded honeycomb segment assembly 4, when rapid heating or rapid cooling takes place. As described above, the honeycomb structure 100 of the present embodiment is the honeycomb structure of a segment structure, and hence has remarkably excellent heat shock resisting properties. The volume resistivity of the honeycomb segment 6 is a value measured by a four-terminal method. The volume resistivity of the honeycomb segment 6 is a value at 400° C.

Furthermore, a volume resistivity of the bonded honeycomb segment assembly 4 is from 1 to 200 Ωcm, and hence even when a current is allowed to flow by using a power source of a high voltage, the current does not excessively flow, so that the honeycomb structure can suitably be used as a heater. Furthermore, the volume resistivity of the bonding layer 7 is from 2 to 2000 Ωcm, and hence the flow of the current via the bonding layer 7 between the adjacent honeycomb segments 6, 6 can be a suitable flow. In consequence, the current flowing in the bonded honeycomb segment assembly 4 is inhibited from being disturbed by the bonding layer 7 or inhibited from preferentially flowing through the bonding layer 7, when a voltage is applied to the assembly.

Furthermore, in the honeycomb structure 100 of the present embodiment, each of the pair of electrode members 21, 21 is formed into the band-like shape extending in the extending direction of the cells 2 of the bonded honeycomb segment assembly 4. In the cross section of the honeycomb structure 100 which is perpendicular to the extending direction of the cells 2, the one electrode member 21 in the pair of electrode members 21, 21 is disposed on a side opposite to the other electrode member 21 in the pair of electrode members 21, 21 via the center O of the bonded honeycomb segment assembly 4. Therefore, it is possible to inhibit an unevenness of a temperature distribution of the bonded honeycomb segment assembly 4, when the voltage is applied between the pair of electrode members 21, 21.

Figure 2:
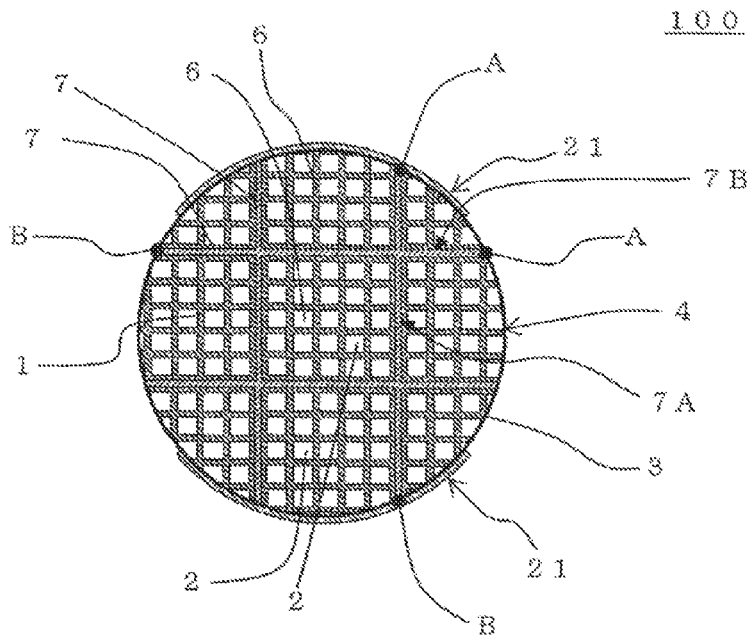
FIG. 2 is a schematic view showing a cross section perpendicular to a cell extending direction in the one embodiment of the honeycomb structure of the present invention.
Figure 3:
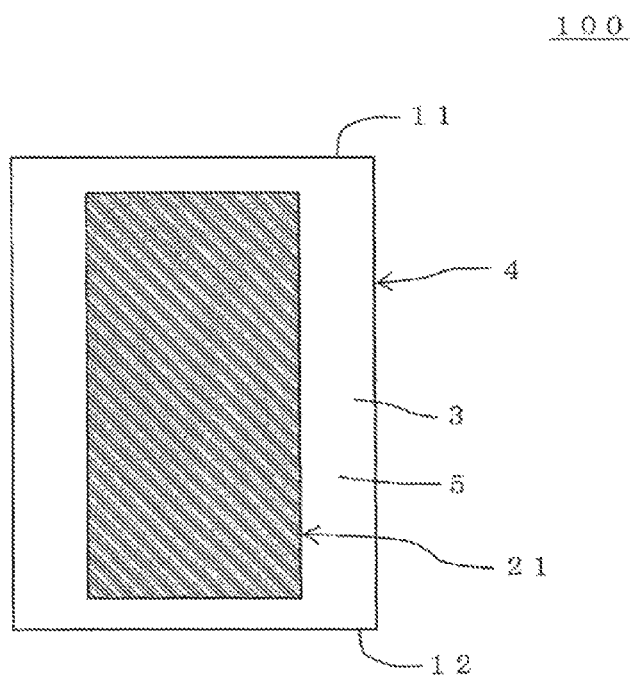
FIG. 3 is a front view showing the one embodiment of the honeycomb structure of the present invention.
Figure 4:
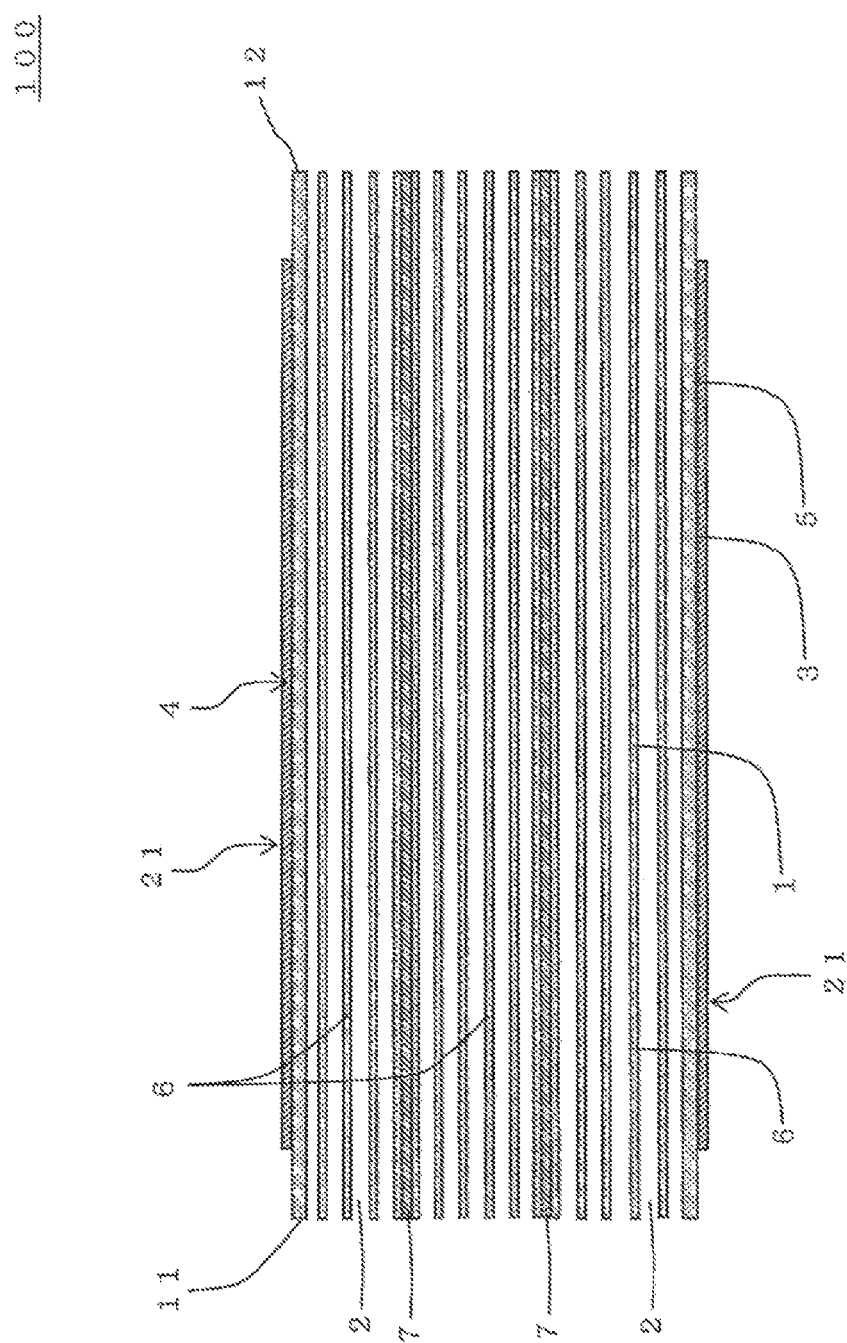
FIG. 4 is a schematic view showing a cross section parallel to the cell extending direction in the one embodiment of the honeycomb structure of the present invention.
Figure 5:
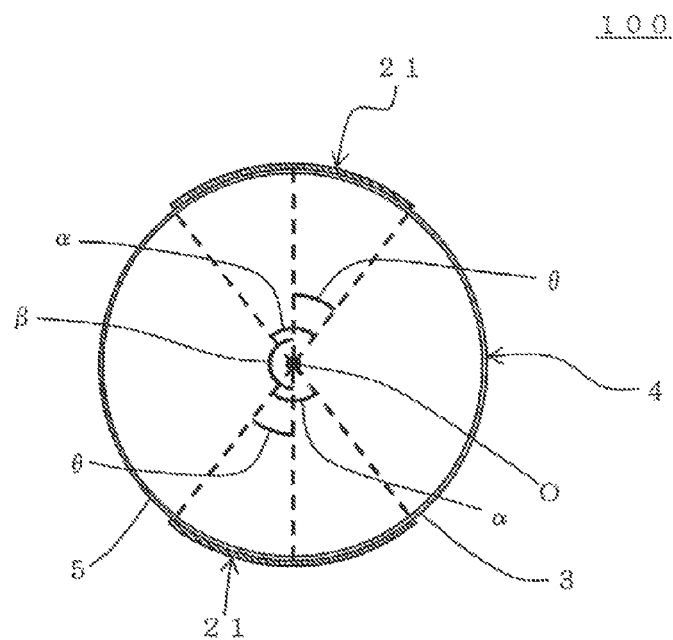
FIG. 5 is a schematic view showing the cross section perpendicular to the cell extending direction in the one embodiment of the honeycomb structure of the present invention.

Here, FIG. 1 is a perspective view schematically showing the one embodiment of the honeycomb structure of the present invention. FIG. 2 is a schematic view showing the cross section perpendicular to the cell extending direction in the one embodiment of the honeycomb structure of the present invention. FIG. 3 is a plan view schematically showing the one embodiment of the honeycomb structure of the present invention. FIG. 4 is a schematic view showing a cross section parallel to the cell extending direction in the one embodiment of the honeycomb structure of the present invention. FIG. 5 is a schematic view showing the cross section perpendicular to the cell extending direction in the one embodiment of the honeycomb structure of the present invention. In FIG. 5, the partition walls are omitted. Furthermore, each of the honeycomb segments 6 has the porous partition walls 1 to define and form the plurality of cells 2 which become the through channels for the fluid and extend from the one end surface 11 to the other end surface 12, and an outer wall (a surface of the outer wall becomes a side surface of the honeycomb segment 6).

Here, "the cross section perpendicular to the extending direction of the cells 2" is simply referred to as "the cross section" sometimes. Moreover, "the one electrode member 21 in the pair of electrode members 21, 21" is simply referred to as "the one electrode section 21" sometimes. Furthermore, "the other electrode member 21 in the pair of electrode members 21, 21" is simply referred to as "the other electrode member 21" sometimes. Furthermore, in the cross section, an angle formed by "a line segment connecting a center point of the one electrode member 21 to the center O of the bonded honeycomb segment assembly 4" and "a line segment connecting a center point of the other electrode member 21 to the center O of the bonded honeycomb segment assembly 4" is an angle β. The angle β is an angle around "the center O". At this time, when "in the cross section, the one electrode member 21 is disposed on the side opposite to the other electrode member 21 via the center O of the bonded honeycomb segment assembly 4", the following is meant. That is, it is meant that as shown in FIG. 5, the pair of electrode members 21, 21 are disposed on the bonded honeycomb segment assembly 4 in such a positional relation that the angle β is in a range of 170° to 190° in the cross section. It is to be noted that "the center point of the one electrode member 21" is the point of the center of the one electrode member 21 in "a peripheral direction of the bonded honeycomb segment assembly 4". Moreover, "the center point of the other electrode member 21" is the point of the center of the other electrode member 21 in "the peripheral direction of the bonded honeycomb segment assembly 4".

In the honeycomb structure 100 of the present embodiment, a material of the honeycomb segments 6 preferably contains a silicon-silicon carbide composite material or a silicon carbide material as a main component, and is further preferably the silicon-silicon carbide composite material or the silicon carbide material. "The material of the honeycomb segments 6" is a material of the partition walls 1 of the honeycomb segments 6 and a side surface (the outer wall) of each of the honeycomb segments 6. Furthermore, "the main component" is a component contained 90 mass % or more of the whole material. By using such a material, the volume resistivity of the honeycomb segments 6 can be from 1 to 200 Ωcm. Here, the silicon-silicon carbide composite material contains silicon carbide particles as an aggregate and silicon as a binding material which binds the silicon carbide particles, and a plurality of silicon carbide particles are preferably bound by silicon so as to form pores among the silicon carbide particles. Furthermore, a silicon carbide material is obtained by sintering the silicon carbide particles each other. "The volume resistivity" is a value at 400° C. In the present description, "silicon" means metal silicon.

Furthermore, as to the bonding layer 7, at least a part of the bonding layer is made of a bonding material having a conductivity. There is not any special restriction on a material of the bonding layer 7. The material of the bonding layer 7 of a conductive portion is preferably a material containing a silicon-silicon carbide composite material or a silicon carbide material as a main component, and is further preferably the silicon-silicon carbide composite material or the silicon carbide material. It is to be noted that "the material of the bonding layer 7 of the conductive portion" means "the material of the bonding material having the conductivity" which constitutes at least a part of the bonding layer.

The whole bonding layer 7 may be made of the bonding material having the conductivity, or a part of the bonding layer may be made of the bonding material having the conductivity and the remaining part thereof may be made of a bonding material having a non-conductivity. However, in the honeycomb structure 100 of the present embodiment, when the voltage is applied between the pair of electrode members 21, 21, the current preferably flows from the one electrode member 21 to the other electrode member 21 via the honeycomb segments 6 and the bonding layer 7. Furthermore, the current preferably flows through all the plurality of honeycomb segments 6. That is, when the bonding layer 7 is partially made of the bonding material having the non-conductivity, it is preferable to prevent a situation where "one honeycomb segment 6 is electrically insulated and separated by the non-conductive bonding layer".

Furthermore, when the whole bonding layer 7 is made of the bonding material having the conductivity, a part of the material of the bonding layer 7 may be different, or the whole material of the bonding layer 7 may be the same. For example, when the material of the bonding layer 7 is partially different, the volume resistivity of the bonding layer 7 can partially be changed. In consequence, it is also possible to control the flow of the current in the bonded honeycomb segment assembly 4 during the application of the voltage between the pair of electrode members 21, 21. Furthermore, when the whole material of the bonding layer 7 is the same, it is possible easily manufacture the honeycomb structure 100 which is a catalyst carrier and also suitably functions as the heater when the voltage is applied thereto and further, which has excellent heat shock resisting properties. It is to be noted that as described later, the volume resistivity of the bonding layer 7 can be controlled by regulating a porosity and the like of the bonding layer 7.

When the bonding layer 7 is partially made of the bonding material having the non-conductivity, there is not any special restriction on the material of the bonding material having the non-conductivity, as long as the honeycomb segments 6 can be bonded to one another. An example of the material is a mixture of a ceramic material, a fiber material, a cement and the like.

The volume resistivity of the bonding layer 7 is from 2 to 2000 Ωcm, preferably from 25 to 1250 Ωcm, and further preferably from 50 to 467 Ωcm. When the volume resistivity of the bonding layer 7 is in such a range, the current can flow through all the plurality of honeycomb segments 6 during the application of the voltage between the pair of electrode members 21, 21. When the volume resistivity of the bonding layer 7 is smaller than 2 Ωcm, the flow of the current becomes non-uniform, and the honeycomb structure unfavorably partially has a high temperature and partially has a low temperature during the application of the voltage to the honeycomb structure 100 (during the application of the voltage between a pair of electrodes). Also when the volume resistivity of the bonding layer 7 is larger than 2000 Ωcm, the flow of the current becomes non-uniform, and the honeycomb structure unfavorably partially has the high temperature and partially has the low temperature during the application of the voltage to the honeycomb structure 100. The volume resistivity of the bonding layer 7 is a value measured by the four-terminal method. The volume resistivity of the bonding layer 7 is a value at 400° C.

The volume resistivity of the bonding layer 7 having the conductivity is $\rho jo$ (Ωcm), an open frontal area ratio (a cell open frontal area ratio) of the honeycomb segment is OFA, the volume resistivity of the honeycomb segment is $\rho A$ and a numeric value calculated in accordance with a formula of $\rho A/(1-OFA/100)$ is a converted volume resistivity $Rjo$ (Ωcm). In this case, a value of "$\rho jo/Rjo$" as a value of a ratio of the volume resistivity $\rho jo$ to the converted volume resistivity $Rjo$ is preferably from 0.2 to 3.0, further preferably from 0.45 to 2.5, and especially preferably from 0.5 to 2.0. When the value is smaller than 0.2, a fluctuation of the temperature of the honeycomb structure during the energization is large sometimes. Furthermore, also when the value is in excess of 3.0, the fluctuation of the temperature of the honeycomb structure during the energization is large sometimes. Furthermore, the OFA is preferably from 50 to 90%, further preferably from 60 to 88%, and especially preferably from 70 to 85%. When the OFA is smaller than 50%, a pressure loss during the flowing of an exhaust gas is large sometimes. When the OFA is in excess of 90%, a strength of the honeycomb structure deteriorates sometimes. The OFA (the cell open frontal area ratio) is a ratio (%) of a volume of the cells to a volume of the honeycomb segments.

The porosity of the bonding layer 7 is preferably from 30 to 70%, further preferably from 40 to 65%, and especially preferably from 45 to 60%. The porosity of the bonding layer 7 has an influence on a value of the volume resistivity of the bonding layer 7, and by the above-mentioned porosity, the whole bonded honeycomb segment assembly 4 can more evenly generate the heat. When the porosity is smaller than 30%, the volume resistivity is small sometimes. When the porosity is larger than 70%, the volume resistivity is large sometimes. The porosity of the bonding layer 7 is a value measured by a mercury porosimeter.

A thickness of the bonding layer 7 is preferably from 0.1 to 5.0 mm and further preferably from 0.5 to 3.0 mm. The thickness of the bonding layer 7 which bonds the honeycomb segments 6 to one another has an influence on a resistance value of the bonding layer 7, and by the above-mentioned thickness, the whole bonded honeycomb segment assembly 4 can more evenly generate the heat. When the thickness is smaller than 0.1 mm, the heat shock resisting properties deteriorate sometimes. When the thickness is larger than 5.0 mm, the heat shock resisting properties deteriorate and further, the pressure loss during the flowing of the exhaust gas is excessively large sometimes.

By regulating the volume resistivity of the bonding layer 7, the porosity of the bonding layer 7 and the thickness of the bonding layer 7 described hitherto, the resistance value of the bonding layer 7 of the honeycomb structure 100 (i.e., the bonded honeycomb segment assembly 4) can be adjusted. The resistance value of the bonding layer 7 is preferably set to a desirable value by regulating the respective numeric value ranges described above.

Furthermore, the bonding layer 7 functions as a buffer member which alleviates heat stress of the bonded honeycomb segment assembly 4. Therefore, the bonding layer 7 is not sintered integrally with sintered bodies of the honeycomb segments 6, but preferably bonds side surfaces of the sintered bodies of the plurality of honeycomb segments 6 to each other. According to such a constitution, the honeycomb structure 100 having excellent heat shock resisting properties can be obtained. For example, when the bonding layer 7 is sintered integrally with the honeycomb segments 6, i.e., integrated by diffusion bonding, the heat stress of the bonded honeycomb segment assembly 4 cannot sufficiently be alleviated by the bonding layer 7.

As shown in FIG. 2, in the cross section perpendicular to the extending direction of the cells 2, the bonding layer 7 has a both-end contact linear portion 7A, and a resistance value between both end portions A and B in the both-end contact linear portion 7A is larger than a resistance value of the honeycomb segment. The resistance value of the bonding layer can be regulated by regulating the volume resistivity of the bonding layer. The volume resistivity of the bonding layer is preferably regulated by changing the material of the bonding layer. For example, an amount of Si to be contained in the bonding layer, an amount of SiC crystals to be contained in the bonding layer, the porosity of the bonding layer and the like are changed, so that the volume resistivity of the bonding layer can be regulated. Among portions constituting the bonding layer 7, the both-end contact linear portion 7A is a linear portion in which "one end portion A comes in contact with the one electrode member 21 and the other end portion B comes in contact with the other electrode member 21". It is to be noted that when "the end portion of the bonding layer comes in contact with the electrode member", there is included a case where an outer peripheral wall is interposed between the end portion of the bonding layer and the electrode member (a case where the end portion of the bonding layer comes in contact with the electrode member via the outer peripheral wall). The bonding layer 7 has such a structure, and hence when the voltage is applied between the pair of electrode members 21, 21, it is possible to avoid a state where "a large amount of current flows from the one electrode member 21 to the other electrode member 21 through the bonding layer 7 and the current flowing through the honeycomb segments 6 decreases". That is, when the voltage is applied between the pair of electrode members 21, 21, the current can be allowed to sufficiently flow through the honeycomb segments 6. Furthermore, the current can be allowed to flow evenly through the whole honeycomb structure 100, and the heat can be generated evenly in the whole honeycomb structure.

As shown in FIG. 2, in the cross section perpendicular to the extending direction of the cells 2, the bonding layer 7 has a non-contact transverse linear portion 7B, and a resistance value between both end portions A and B in the non-contact transverse linear portion 7B is smaller than a resistance value of the honeycomb segment 6, preferably. Among the portions constituting the bonding layer 7, the non-contact transverse linear portion 7B is a linear portion in which "both the end portions A and B are positioned in an outer periphery of the bonded honeycomb segment assembly 4 and do not come in contact with the electrode members 21 and which intersects with a line segment connecting centers of the pair of electrode members 21, 21 to each other". The bonding layer 7 has such a structure, and hence it is possible to avoid a state where "when the current flows between the honeycomb segments 6, 6, the flow of the current is disturbed by the bonding layer 7" during the application of the voltage between the pair of electrode members 21, 21. That is, when the voltage is applied between the pair of electrode members 21, 21, the current sufficiently flows between the honeycomb segments 6, 6 and the current can evenly flow through the whole honeycomb structure 100. Furthermore, the heat can evenly be generated in the whole honeycomb structure.

Figure 6:
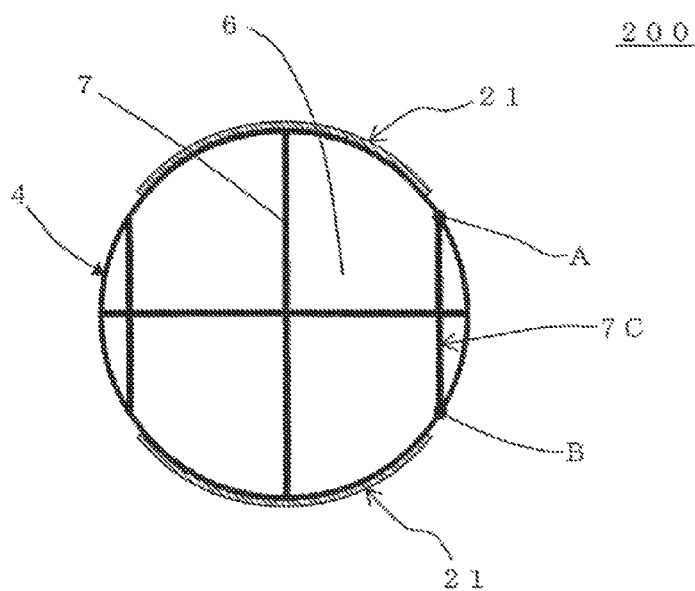
FIG. 6 is a schematic view showing a cross section perpendicular to a cell extending direction in another embodiment of the honeycomb structure of the present invention.

As shown in FIG. 6, in a cross section perpendicular to the extending direction of cells 2, a bonding layer 7 has a non-contact vertical linear portion 7C, and a resistance value between both end portions A and B in the non-contact vertical linear portion 7C is larger than a resistance value of a honeycomb segment 6. Among portions constituting the bonding layer 7, the non-contact vertical linear portion 7C is a linear portion "in which both the end portions A and B are positioned in an outer periphery of a bonded honeycomb segment assembly 4 and do not come in contact with electrode members 21 and which does not intersect with a line segment connecting centers of a pair of electrode members 21, 21 to each other". The bonding layer 7 has such a structure, and hence it is possible to avoid a state where "the current preferentially flows through the bonding layer 7, and the current flowing through the honeycomb segments 6 decreases" during the application of a voltage between the pair of electrode members 21, 21. That is, when the voltage is applied between the pair of electrode members 21, 21, the current can be allowed to sufficiently flow through the honeycomb segments 6, and heat can be generated evenly in the whole honeycomb structure. Furthermore, a current can be allowed to flow evenly through an entire honeycomb structure 200. FIG. 6 is a schematic view showing a cross section perpendicular to an extending direction of the cells 2 in another embodiment (the honeycomb structure 200) of the honeycomb structure of the present invention. In FIG. 6, partition walls and the cells are omitted.

Figure 7:
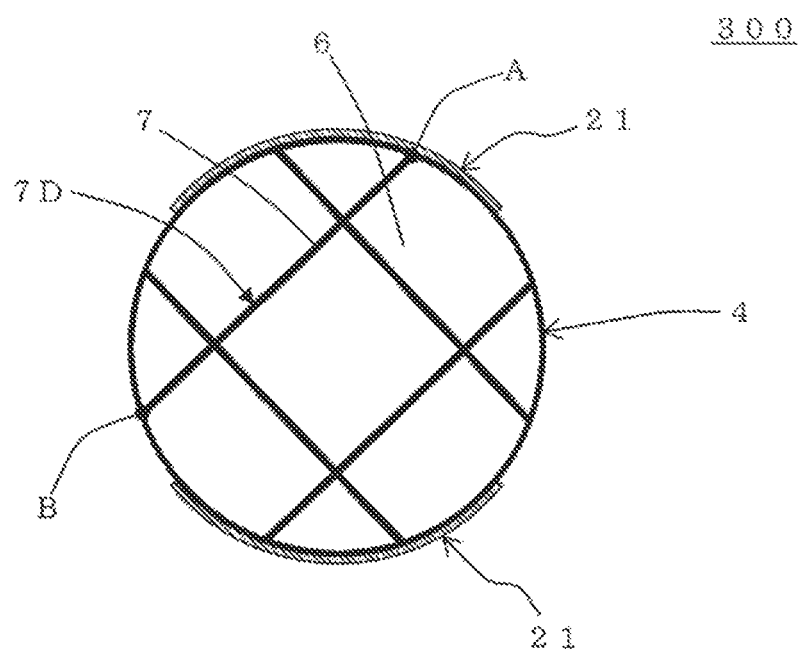
FIG. 7 is a schematic view showing a cross section perpendicular to a cell extending direction in still another embodiment of the honeycomb structure of the present invention.

As shown in FIG. 7, in a cross section perpendicular to an extending direction of cells 2, a bonding layer 7 has a one-end contact linear portion 7D, and a resistance value between both end portions A and B in the one-end contact linear portion 7D is larger than a resistance value of a honeycomb segment. Among portions constituting the bonding layer 7, the one-end contact linear portion 7D is a linear portion "in which both the end portions A and B are positioned in an outer periphery of a bonded honeycomb segment assembly 4 and the only one end portion A comes in contact with an electrode member 21". The bonding layer 7 has such a structure, and hence when a voltage is applied between a pair of electrode members 21, 21, it is possible to avoid a state where "a large amount of current flows from one electrode member 21 to the other electrode member 21 through the bonding layer 7 and the current flowing through honeycomb segments 6 decreases". That is, when the voltage is applied between the pair of electrode members 21, 21, the current can be allowed to sufficiently flow through the honeycomb segments 6. Furthermore, the current can be allowed to flow evenly through an entire honeycomb structure 300, and the heat can be generated evenly in the whole honeycomb structure. FIG. 7 is a schematic view showing a cross section perpendicular to the cell extending direction in still another embodiment (the honeycomb structure 300) of the honeycomb structure of the present invention. In FIG. 7, partition walls and the cells are omitted.

In the honeycomb structure 100 of the present embodiment, a thickness of the partition walls of each of the honeycomb segments 6 (hereinafter also referred to as "the partition wall thickness") is preferably from 50 to 260 μm and preferably from 70 to 180 μm. The partition wall thickness is in such a range, whereby when the honeycomb structure 100 is used as the catalyst carrier and a catalyst is loaded thereonto, the pressure loss during the flowing of the exhaust gas can be prevented from being excessively large. When the partition wall thickness is smaller than 50 μm, the strength of the honeycomb structure deteriorates sometimes. When the partition wall thickness is larger than 260 μm, the pressure loss during the flowing of the exhaust gas is large sometimes, in the case where the honeycomb structure 100 is used as the catalyst carrier and the catalyst is loaded thereonto.

In the honeycomb structure 100 of the present embodiment, a cell density of each of the honeycomb segments 6 is preferably from 40 to 150 cells/cm$^2$ and further preferably from 70 to 100 cells/cm$^2$. When the cell density is in such a range, a purification performance of the catalyst can be heightened in a state where the pressure loss during the flowing of the exhaust gas is small. When the cell density is lower than 40 cells/cm$^2$, a catalyst loading area decreases sometimes. When the cell density is higher than 150 cells/cm$^2$, the pressure loss during the flowing of the exhaust gas is large sometimes, in the case where the honeycomb structure 100 is used as the catalyst carrier and the catalyst is loaded thereonto.

In the honeycomb structure 100 of the present embodiment, an average particle diameter of the silicon carbide particles (the aggregate) constituting the respective honeycomb segments 6 is preferably from 3 to 50 μm and further preferably from 3 to 40 μm. When the average particle diameter of the silicon carbide particles constituting the respective honeycomb segments 6 is in such a range, the volume resistivity of each of the honeycomb segments 6 at 400° C. can be from 1 to 200 Ωcm. When the average particle diameter of the silicon carbide particles is smaller than 3 μm, the volume resistivity of the honeycomb segment 6 is large sometimes. When the average particle diameter of the silicon carbide particles is larger than 50 μm, the volume resistivity of the honeycomb segment 6 is small sometimes. Furthermore, when the average particle diameter of the silicon carbide particles is larger than 50 μm, a die for extrusion-forming is clogged with a forming raw material sometimes during the extrusion-forming of a formed body of each honeycomb segment. The average particle diameter of the silicon carbide particles is a value measured by the following method. That is, the average particle diameter of the silicon carbide particles constituting the honeycomb segments is a value obtained from an image obtained by observing cross sections and surfaces of the honeycomb segments by a scanning electron microscope (SEM). Specifically, a sample for observing "the cross section" and "the surface" is first cut out from the honeycomb segment. As to the cross section of the honeycomb segment, concaves and convexes of the cross section are filled with a resin, the cross section is further polished, and a polished surface is observed. On the other hand, as to the surface of the honeycomb segment, the cut sample (the partition wall) is observed as it is. To analyze the image, image processing software (Image J manufactured by National Institute of Health (NIH) Co.) or the like can be used.

In the honeycomb structure 100 of the present embodiment, the volume resistivity of each of the honeycomb segments 6 is from 1 to 200 Ωcm, preferably from 10 to 150 Ωcm, and further preferably from 15 to 70 Ωcm. When the volume resistivity is smaller than 1 Ωcm, the current excessively flows sometimes, for example, during the energization of the honeycomb structure 100 by the power source of the high voltage of 200 V or more. When the volume resistivity is larger than 200 Ωcm, the current does not easily flow and the heat is not sufficiently generated sometimes, for example, during the energization of the honeycomb structure 100 by the power source of the high voltage of 200 V or more. The volume resistivity of the honeycomb segment is a value measured by the four-terminal method. The volume resistivity of the honeycomb segment is a value at 400° C. The volume resistivity of the honeycomb segment 6 can be regulated by regulating "the average particle diameter of silicon carbide", "the porosity of the honeycomb segment", "an amount of silicon to be contained in the honeycomb segment" and the like.

In the honeycomb structure 100 of the present embodiment, when the material of the honeycomb segments 6 is the silicon-silicon carbide composite material, a relation of a content between silicon and silicon carbide is preferably as follows. First, "a mass of the silicon carbide particles as the aggregate" to be contained in the honeycomb segments 6 is "an aggregate mass", and "a mass of silicon as the binding material" to be contained in the honeycomb segments 6 is "a silicon mass". At this time, a ratio of "the silicon mass" to the total of "the aggregate mass" and "the silicon mass" is preferably from 10 to 40 mass % and further preferably from 15 to 35 mass %. When the ratio is lower than 10 mass %, the strength of the honeycomb structure deteriorates sometimes. When the ratio is higher than 40 mass %, the shape cannot be held sometimes during firing.

A porosity of the partition walls 1 of the honeycomb segments 6 is preferably from 35 to 60% and further preferably from 45 to 55%. When the porosity is smaller than 35%, deformation during the firing is disadvantageously large sometimes. When the porosity is in excess of 60%, the strength of the honeycomb structure deteriorates sometimes. The porosity is a value measured by the mercury porosimeter.

An average pore diameter of the partition walls 1 of the honeycomb segments 6 is preferably from 2 to 15 µm and further preferably from 4 to 8 µm. When the average pore diameter is smaller than 2 µm, the volume resistivity is excessively large sometimes. When the average pore diameter is larger than 15 µm, the volume resistivity is excessively small sometimes. The average pore diameter is a value measured by the mercury porosimeter.

In the respective honeycomb segments 6, a shape of the cells 2 in the cross section perpendicular to the extending direction of the cells 2 is preferably a quadrangular shape, a hexagonal shape, an octagonal shape, or any combination of these shapes. When the cell shape is such a shape, the pressure loss during the flowing of the exhaust gas through the honeycomb structure 100 is small, and the purification performance of the catalyst is excellent.

There is not any special restriction on a shape of the honeycomb segment, as long as the side surfaces of the plurality of honeycomb segments can be bonded to each other by the bonding layer. Specifically, the shape of the honeycomb segment is preferably a tubular shape in which a shape of a cross section vertical to the cell extending direction is a polygonal shape (a quadrangular shape, a pentangular shape, a hexagonal shape, a heptagonal shape, an octagonal shape or the like).

There is not any special restriction on a shape of the bonded honeycomb segment assembly 4, and examples of the shape include a tubular shape with a bottom surface having a round shape (a cylindrical shape), a tubular shape with a bottom surface having an oval shape (an oval tubular shape), and a tubular shape (a square pillar shape) with a bottom surface having a polygonal shape (a quadrangular shape, a pentangular shape, a hexagonal shape, a heptagonal shape, an octagonal shape or the like). Furthermore, as to a size of the honeycomb structure, an area of the bottom surface is preferably from 2000 to 20000 $mm^2$ and further preferably from 4000 to 10000 $mm^2$. Furthermore, a length of the honeycomb structure (i.e., the bonded honeycomb segment assembly) in a central axis direction (cell extending direction) is preferably from 50 to 200 mm and further preferably from 75 to 150 mm.

An isostatic strength of the honeycomb structure 100 of the present embodiment is preferably 1 MPa or more and further preferably 3 MPa or more. A larger value of the isostatic strength is more preferable, but an upper limit of the value is about 6 MPa when the material, structure and the like of the honeycomb structure 100 are taken into consideration. When the isostatic strength is smaller than 1 MPa, the honeycomb structure is easily damaged sometimes during the use of the honeycomb structure as the catalyst carrier or the like. The isostatic strength is a value measured under static pressure in water.

The honeycomb structure of the present invention can be used as the catalyst carrier, and a known catalyst is loaded onto the honeycomb structure of the present invention by a known method, so that the honeycomb structure can be used as the catalyst for an exhaust gas treatment.

The bonded honeycomb segment assembly 4 of the honeycomb structure 100 of the present embodiment has an outer peripheral wall 3 in the most outer periphery of the bonded assembly in which the plurality of honeycomb segments 6 are bonded by the bonding layer 7. The outer peripheral wall 3 is disposed to surround an outer peripheral portion of the bonded assembly in which the plurality of honeycomb segments 6 are bonded by the bonding layer 7. For example, the outer peripheral wall 3 can be formed by grinding and processing, into a predetermined shape, the outer peripheral portion of the bonded assembly in which the plurality of honeycomb segments 6 are bonded by the bonding layer 7 and applying an outer periphery coating material to the most outer periphery of the ground and processed bonded assembly. It is to be noted that the honeycomb structure of the present invention may have the outer peripheral wall, or may not have the outer peripheral wall.

A material of the outer peripheral wall 3 preferably contains a silicon-silicon carbide composite material or a silicon carbide material as main components, and is further preferably the silicon-silicon carbide composite material or the silicon carbide material. By using such a material, a volume resistivity of the outer peripheral wall 3 can be a value equal to the volume resistivity of the honeycomb segments 6.

As shown in FIG. 1 to FIG. 5, in the honeycomb structure 100 of the present embodiment, the pair of electrode members 21, 21 are disposed on the side surface 5 of the bonded honeycomb segment assembly 4 (i.e., the surface of the outer peripheral wall 3). In the honeycomb structure 100 of the present embodiment, the voltage is applied between the pair of electrode members 21 and 21, thereby generating the heat. The voltage to be applied is preferably from 12 to 900 V and further preferably from 64 to 600 V.

As shown in FIG. 1 to FIG. 5, in the honeycomb structure 100 of the present embodiment, each of the pair of electrode members 21, 21 is formed into the band-like shape extending in the extending direction of the cells 2 of the bonded honeycomb segment assembly 4. Furthermore, in the cross section perpendicular to the extending direction of the cells 2, the one electrode member 21 in the pair of electrode members 21, 21 is disposed on the side opposite to the other electrode member 21 in the pair of electrode members 21, 21 via the center O of the bonded honeycomb segment assembly 4. In the honeycomb structure 100 of the present embodiment, further, in the cross section perpendicular to the extending direction of the cells 2, an angle of 0.5 times a central angle $\alpha$ of each of the electrode members 21, 21 (an angle $f$ of 0.5 times the central angle $\alpha$) is preferably from 15 to 65° and further preferably from 30 to 60°. The electrode members have such a constitution, and hence when the voltage is applied between the pair of electrode members 21, 21, an unevenness of the current flowing in the bonded honeycomb segment assembly 4 can more effectively be inhibited. That is, the current flowing in the bonded honeycomb segment assembly 4 can be allowed to more evenly flow. In consequence, the unevenness of the heat generation in the bonded honeycomb segment assembly 4 can be inhibited. As shown in FIG. 5, "the central angle $\alpha$ of the electrode member 21" is an angle formed by two line segments connecting both ends of the electrode member 21 to the center O of the bonded honeycomb segment assembly 4 in the cross section perpendicular to the cell extending direction. That is, the central angle in the cross section perpendicular to the cell extending direction is an inner angle of a portion of the center O in a shape (e.g., a fan shape) formed by "the electrode member 21", "the line segment connecting one end portion of the electrode member 21 to the center O" and "the line segment connecting the other end portion of the electrode member 21 to the center O".

Furthermore, "the angle $\theta$ of 0.5 times the central angle $\alpha$" of the one electrode member 21 preferably has a size of 0.8 to 1.2 times and further preferably a size of 1.0 times (the same size) to "the angle $\theta$ of 0.5 times the central angle $\alpha$" of the other electrode member 21. In consequence, when the voltage is applied between the pair of electrode members 21 and 21, it is possible to more effectively inhibit the unevenness of the current flowing in the bonded honeycomb segment assembly 4, which makes it possible to more effectively inhibit the unevenness of the heat generation in the bonded honeycomb segment assembly 4.

In the honeycomb structure of the present embodiment, for example, as shown in FIG. 1 to FIG. 5, the electrode member 21 has such a shape as obtained by curving a planar rectangular member along an outer periphery of a cylindrical shape. Here, a shape obtained when the curved electrode member 21 is deformed into a planar member which is not curved will be referred to as "the planar shape" of the electrode member 21. The above-mentioned "planar shape" of the electrode member 21 shown in FIG. 1 to FIG. 5 is a rectangular shape. Furthermore, "an outer peripheral shape of the electrode member" means "the outer peripheral shape in the planar shape of the electrode member".

In the honeycomb structure of the present embodiment, as shown in FIG. 1 to FIG. 5, the outer peripheral shape of the band-like electrode member 21 may be a rectangular shape, but the outer peripheral shape of the band-like electrode member 21 is "a shape in which corner portions of the rectangular shape are formed into a curved shape" in another preferable configuration. Furthermore, the outer peripheral shape of the band-like electrode member 21 is "a shape in which the corner portions of the rectangular shape are linearly chamfered" in still another preferable configuration. A composite application of "a curved shape" and "a linear shape" is also preferable (in the rectangular shape, at least one of the corner portions has "a curved shape", and at least one of the corner portions has "a linearly chamfered shape").

As described above, the outer peripheral shape of the electrode member 21 is "the shape in which the corner portions of the rectangular shape are formed into the curved shape" or "the shape in which the corner portions of the rectangular shape are linearly chamfered", so that the heat shock resisting properties of the honeycomb structure can further be enhanced. When the corner portions of the electrode member have right angles, there is a tendency that stress in the vicinity of "each corner portion of the electrode member" in the bonded honeycomb segment assembly is relatively high as compared with the other portions. On the contrary, when the corner portions of the electrode member are curved or linearly chamfered, it is possible to lower the stress in the vicinity of "each corner portion of the electrode member" in the bonded honeycomb segment assembly.

Furthermore, in the honeycomb structure of the present embodiment, the electrode member preferably does not have "a corner portion "in which an inner angle is smaller than 90°"". When the electrode member has "the corner portion "in which the inner angle is smaller than 90°"" and when heat shock is applied to the honeycomb structure, the high stress is easily applied to the bonded honeycomb segment assembly in the vicinity of "the corner portion "in which then inner angle is smaller than 90°"".

In the honeycomb structure of the present embodiment, a thickness of each of the pair of electrode members is preferably from 0.025 to 1.0 mm, further preferably from 0.025 to 0.7 mm, and especially preferably from 0.05 to 0.5 mm. The thickness of the electrode member is small in this manner, so that a heat capacity of the electrode member can be low, and the heat shock resisting properties of the honeycomb structure can be enhanced. When the thickness of the electrode member is smaller than 0.025 mm, it is difficult to allow the current to evenly flow through the bonded honeycomb segment assembly. When the thickness of the electrode member is larger than 1.0 mm, the heat capacity of the electrode member is not easily lowered. The thickness of the electrode member is a value measured by an optical microscope.

When the honeycomb structure of the present embodiment has the outer peripheral wall, a thickness of the outer peripheral wall is preferably from 0.1 to 1.0 mm, further preferably from 0.2 to 0.8 mm, and especially preferably from 0.2 to 0.5 mm. When the thickness of the outer peripheral wall is in such a range, the heat shock resisting properties of the honeycomb structure can be enhanced. In consequence, when the honeycomb structure is used as the catalyst carrier and the catalyst is loaded thereonto, the pressure loss during the flowing of the exhaust gas can be inhibited from being excessively large. When the thickness of the outer peripheral wall of the bonded honeycomb segment assembly is smaller than 0.1 mm, the strength of the honeycomb structure deteriorates sometimes.

When the thickness of the outer peripheral wall of the bonded honeycomb segment assembly is larger than 1.0 mm, the heat shock resisting properties of the honeycomb structure deteriorate sometimes. Furthermore, when the thickness of the outer peripheral wall of the bonded honeycomb segment assembly is larger than 1.0 mm, an area of each partition wall onto which the catalyst is to be loaded is small sometimes in the case where the honeycomb structure is used as the catalyst carrier and the catalyst is loaded thereonto. The thickness of the outer peripheral wall is a value measured by the optical microscope.

In the honeycomb structure of the present embodiment, a porosity of the pair of electrode members is preferably from 30 to 80%, further preferably from 30 to 70%, and especially preferably from 30 to 60%. When the porosity of the electrode members is in such a range, the heat capacity of each electrode member can be lowered, and the heat shock resisting properties of the honeycomb structure can be enhanced. When the porosity of the electrode member is smaller than 30%, the heat capacity of the electrode member cannot easily be lowered sometimes. When the porosity of the electrode member is larger than 80%, it is difficult to allow the current to evenly flow through the bonded honeycomb segment assembly sometimes. Furthermore, when the porosity of the electrode member is larger than 80%, the volume resistivity of the electrode member is excessively high sometimes.

When the honeycomb structure of the present embodiment has the outer peripheral wall, a porosity of the outer peripheral wall of the bonded honeycomb segment assembly is preferably from 35 to 60%, further preferably from 35 to 55%, and especially preferably from 35 to 50%. When the porosity of the outer peripheral wall of the bonded honeycomb segment assembly is in such a range, the heat shock resisting properties of the honeycomb structure can be enhanced. When the porosity of the outer peripheral wall of the bonded honeycomb segment assembly is smaller than 35%, an effect of enhancing the heat shock resisting properties of the honeycomb structure deteriorates sometimes. When the porosity of the outer peripheral wall of the bonded honeycomb segment assembly is larger than 60%, a mechanical strength of the honeycomb structure deteriorates sometimes. The porosity is a value measured by the mercury porosimeter.

In the honeycomb structure of the present embodiment, a volume resistivity of the electrode member 21 is preferably from 0.1 to 100 $\Omega$cm and further preferably from 0.1 to 50 $\Omega$cm. When the volume resistivity of the electrode member 21 is in such a range, each of the pair of electrode members 21, 21 effectively performs a function of an electrode in a piping line where the exhaust gas of a high temperature flows. When the volume resistivity of the electrode member 21 is smaller than 0.1 $\Omega$cm, a temperature of the bonded honeycomb segment assembly in the vicinity of each end of the electrode member 21 easily rises sometimes, in the cross section perpendicular to the cell extending direction. When the volume resistivity of the electrode member 21 is larger than 100 $\Omega$cm, the current does not easily flow, and hence the function of the electrode is not easily performed sometimes. The volume resistivity of the electrode member is a value measured by the four-terminal method. The volume resistivity of the electrode member is a value at 400° C.

The electrode member 21 preferably contains silicon carbide particles and silicon as main components, and is further preferably formed by using the silicon carbide particles and silicon as raw materials except usually contained impurities. Here, when "the silicon carbide particles and silicon are contained as the main components", it is meant that a total mass of the silicon carbide particles and silicon is 90 mass % or more of a mass of the whole electrode member. As described above, the electrode member 21 contains the silicon carbide particles and silicon as the main components. In consequence, the components of the electrode member 21 and the components of the bonded honeycomb segment assembly 4 are the same components or close components (when a material of each portion constituting the bonded honeycomb segment assembly is silicon carbide). Therefore, thermal expansion coefficients of the electrode member 21 and the bonded honeycomb segment assembly 4 are the same value or close values. Furthermore, the material of the electrode member 21 is the same as the material of the bonded honeycomb segment assembly 4, or the materials are close to each other, and hence a bonding strength between the electrode member 21 and the bonded honeycomb segment assembly 4 also heightens. Therefore, even when heat stress is applied to the honeycomb structure, the electrode members 21 can be prevented from being peeled from the bonded honeycomb segment assembly 4, or a bonding portion between the electrode member 21 and the bonded honeycomb segment assembly 4 can be prevented from being damaged.

An average pore diameter of the electrode member 21 is preferably from 5 to 45 $\mu$m and further preferably from 7 to 40 $\mu$m. When the average pore diameter of the electrode member 21 is in such a range, a suitable volume resistivity can be obtained. When the average pore diameter of the electrode member 21 is smaller than 5 $\mu$m, the volume resistivity is excessively high sometimes. When the average pore diameter of the electrode member 21 is larger than 40 $\mu$m, the strength of the electrode member 21 weakens and the electrode member is easily damaged. The average pore diameter is a value measured by the mercury porosimeter.

When the main components of the electrode member 21 are the silicon carbide particles and silicon, an average particle diameter of the silicon carbide particles contained in the electrode member 21 is preferably from 10 to 70 $\mu$m and further preferably from 10 to 60 $\mu$m. When the average particle diameter of the silicon carbide particles contained in the electrode member 21 is in such a range, the volume resistivity of the electrode member 21 can be controlled in a range of 0.1 to 100 $\Omega$cm. When the average particle diameter of the silicon carbide particles contained in the electrode member 21 is smaller than 10 $\mu$m, the volume resistivity of the electrode member 21 is excessively large sometimes. When the average particle diameter of the silicon carbide particles contained in the electrode member 21 is larger than 70 $\mu$m, the strength of the electrode member 21 weakens and the electrode member is easily damaged sometimes. The average particle diameter of the silicon carbide particles contained in the electrode member 21 is a value measured by the same method as in the average particle diameter of the silicon carbide particles constituting the honeycomb segments.

A ratio of a mass of silicon contained in the electrode member 21 to "a total of respective masses of the silicon carbide particles and silicon" contained in the electrode member 21 is preferably from 20 to 50 mass % and further preferably from 20 to 40 mass %. When the ratio of the mass of silicon to the total of the respective masses of the silicon carbide particles and silicon contained in the electrode member 21 is in such a range, the volume resistivity of the electrode member 21 can be controlled in a range of 0.1 to 100 $\Omega$cm. When the ratio of the mass of silicon to the total of the respective masses of the silicon carbide particles and silicon contained in the electrode member 21 is smaller than 20 mass %, the volume resistivity is excessively large sometimes.

When the ratio is larger than 50 mass %, the electrode member is easily deformed sometimes during the manufacturing.

(2) Manufacturing Method of Honeycomb Structure:

Next, a manufacturing method of the honeycomb structure of the present invention will be described.

First, to silicon carbide powder (silicon carbide), there are added metal silicon powder (metal silicon), a binder, water and the like, to prepare a forming raw material for the honeycomb segments. The forming raw material preferably contains a surfactant and a pore former, if necessary. A mass of metal silicon is preferably from 10 to 50 mass % of a total of a mass of the silicon carbide powder and the mass of metal silicon. An average particle diameter of silicon carbide particles in the silicon carbide powder is preferably from 3 to 50 µm and further preferably from 3 to 40 µm. An average particle diameter of metal silicon (the metal silicon powder) is preferably from 1 to 35 µm. The average particle diameters of the silicon carbide particles and metal silicon (metal silicon particles) are values measured by a laser diffraction method. The silicon carbide particles are fine particles of silicon carbide constituting the silicon carbide powder, and the metal silicon particles are fine particles of metal silicon constituting the metal silicon powder. It is to be noted that this is a blend of the forming raw material in a case where a material of the honeycomb segments is a silicon-silicon carbide composite material, and metal silicon is not added in a case where the material of the honeycomb segments is silicon carbide.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as pores are formed after the firing, and examples of the pore former include graphite, starch, resin balloons, a water-absorbing resin, and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, a die is clogged sometimes during the formation. The average particle diameter of the pore former is a value measured by the laser diffraction method.

Next, the forming raw material is kneaded to form a kneaded material. There is not any special restriction on a method of kneading the forming raw material to form the kneaded material, and an example of the method is a method using a kneader, a vacuum clay kneader or the like.

Next, the kneaded material is extrusion-formed to prepare honeycomb formed segment bodies. During the extrusion-forming, it is preferable to use the die having desirable entire shape, cell shape, partition wall thickness, cell density and the like. As a material of the die, a hard metal which does not easily wear down is preferable. Each honeycomb formed segment body has a pillar-like structure having partition walls to define and form a plurality of cells which become through channels for a fluid. A plurality of honeycomb formed segment bodies are formed in accordance with the number of segments constituting a bonded assembly. Each honeycomb formed segment body may have an outer wall on a side surface thereof.

A partition wall thickness, a cell density, an outer wall thickness and the like of the honeycomb formed segment body can suitably be determined in accordance with the structure of the honeycomb segment to be prepared, in consideration of shrinkages in the drying and the firing.

The obtained honeycomb formed segment body is preferably dried. There is not any special restriction on a drying method, and examples of the method include electromagnetic heating systems such as microwave heating drying and high frequency dielectric heating drying, and external heating systems such as hot air drying and superheat steam drying. Among these methods, it is preferable that a predetermined amount of a water content is dried by the electromagnetic heating system and then the remaining water content is dried by the external heating system, because the whole formed body can immediately and evenly be dried so that cracks are not generated. As drying conditions, it is preferable that the water content of 30 to 99 mass of the amount of the water content prior to the drying is removed by the electromagnetic heating system and then the water content is decreased to 3 mass % or less by the external heating system. As the electromagnetic heating system, dielectric heating drying is preferable, and as the external heating system, the hot air drying is preferable.

When a length of the honeycomb formed segment body in the central axis direction is not a desirable length, both end surfaces (both end portions) of the formed body are preferably cut to obtain the desirable length. There is not any special restriction on a cutting method, but an example of the method is a method using a round saw cutter or the like.

Next, the honeycomb formed segment body is preferably dried. A drying condition at this time is preferably from 50 to 200° C.

Next, the honeycomb formed segment body is preferably calcinated to remove the binder and the like. The calcinating is preferably performed at 400 to 500° C. in the air atmosphere for 0.5 to 20 hours.

Next, the calcinated honeycomb formed segment body is preferably fired. As firing conditions, heating is preferably performed at 1400 to 1500° C. in an inert atmosphere of nitrogen, argon or the like for one to 20 hours. Furthermore, after the firing, for enhancement of a durability, an oxygenation treatment is preferably performed at 1200 to 1350° C. for one to ten hours. There is not any special restriction on methods of the calcinating, the firing and the oxygenation treatment, and an electric furnace, a gas furnace or the like can be used.

By the above method, a plurality of fired honeycomb segments are preferably prepared.

Next, a bonding material to form the bonding layer which bonds the honeycomb segments is prepared. When main components of the bonding material are silicon carbide and silicon, the bonding material is preferably formed by adding predetermined additives to silicon carbide powder and silicon powder, followed by the kneading. Specifically, to the silicon carbide powder (silicon carbide), there are added metal silicon powder (metal silicon), a binder, a surfactant, a pore former, water and the like, followed by the kneading, to prepare the bonding material. A mass of metal silicon is preferably from 10 to 50 mass % of a total of a mass of the silicon carbide powder and the mass of metal silicon. An average particle diameter of silicon carbide particles in the silicon carbide powder is preferably from 3 to 70 μm and further preferably from 10 to 50 μm. An average particle diameter of metal silicon (the metal silicon powder) is preferably from 1 to 70 μm. The average particle diameters of the silicon carbide particles and metal silicon (metal silicon particles) are values measured by a laser diffraction method. It is to be noted that this is a blend of the bonding material in a case where a material of the bonding layer is a silicon-silicon carbide composite material, and metal silicon is not added in a case where the material of the bonding layer is silicon carbide. Furthermore, the volume resistivity of the bonding layer is preferably regulated by changing the particle diameters of silicon carbide or the amount of the pore former to be added, when the bonding material is prepared.

The binder similar to the binder of the forming raw material of the honeycomb segments can be used. A content of the binder is preferably from 0.1 to 15 parts by mass, when a total mass of the silicon carbide powder and the metal silicon powder is 100 parts by mass.

A content of the water is preferably from 25 to 55 parts by mass, when the total mass of the silicon carbide powder and the metal silicon powder is 100 parts by mass.

The surfactant and the pore former similar to those of the forming raw material of the honeycomb segments can be used. A content of the surfactant is preferably from 0.01 to 3 parts by mass, when the total mass of the silicon carbide powder and the metal silicon powder is 100 parts by mass. A content of the pore former is preferably from 0.5 to 25 parts by mass, when the total mass of the silicon carbide powder and the metal silicon powder is 100 parts by mass.

The bonding material is preferably prepared in a slurry manner by mixing the above-mentioned materials.

Next, the plurality of honeycomb segments are assembled in a predetermined shape while bonding the side surfaces of the honeycomb segments to one another by the bonding material, to prepare the bonded honeycomb segment assembly.

The bonded honeycomb segment assembly is prepared, and then the bonded honeycomb segment assembly is preferably dried. A drying condition at this time is preferably from 50 to 200° C.

Next, the bonded honeycomb segment assembly is preferably calcinated to remove the binder and the like in the bonding material. The calcinating is preferably performed at 400 to 500° C. in the air atmosphere for 0.5 to 20 hours.

Next, the calcinated bonded honeycomb segment assembly is preferably fired to obtain the bonded assembly. By the firing, the plurality of honeycomb segments are firmly bonded by the bonding layer. As firing conditions, heating is preferably performed at 1400 to 1500° C. in an inert atmosphere of nitrogen, argon or the like for one to 20 hours. Furthermore, after the firing, for enhancement of the durability, the oxygenation treatment is preferably performed at 1200 to 1350° C. for one to ten hours. There is not any special restriction on methods of the calcinating, the firing and the oxygenation treatment, and the electric furnace, the gas furnace or the like can be used.

It is to be noted that the honeycomb formed segment bodies are dried, and then the honeycomb formed segment bodies are bonded by using the bonding material. Afterward, the honeycomb formed segment bodies and the bonding material may be fired. In this case, the firing is performed again after an electrode member forming raw material is applied, and hence the number of firing times is two as a whole (the firing is performed twice). Furthermore, the honeycomb formed segment bodies are dried and then the honeycomb formed segment bodies are bonded by using the bonding material, and afterward, the honeycomb formed segment bodies and the bonding material may be dried, and the electrode member forming raw material may be applied prior to the firing. In this case, the firing is performed for the first time after the electrode member forming raw material is applied, and hence the number of the firing times is once as a whole (the firing is performed once).

Next, an outer peripheral portion of the obtained bonded assembly may be ground and processed into a predetermined shape. Furthermore, when the outer peripheral wall is formed, a precursor of the outer peripheral wall may be prepared by applying an outer periphery coating material to an outer peripheral surface of the obtained bonded assembly or the ground and processed bonded assembly.

The outer periphery coating material is preferably prepared by the following method. When main components of the outer periphery coating material are silicon carbide and silicon, predetermined additives are preferably added to silicon carbide powder and silicon powder, followed by the kneading, to form the paste-like outer periphery coating material.

Further specifically, to the silicon carbide powder (silicon carbide), there are preferably added metal silicon powder (metal silicon), a binder, a surfactant, a pore former, water and the like, followed by the kneading, to prepare the outer periphery coating material. A mass of metal silicon is preferably from 20 to 50 parts by mass, when a total mass of the silicon carbide powder and metal silicon is 100 parts by mass. An average particle diameter of silicon carbide particles in the silicon carbide powder is preferably from 3 to 70 μm. An average particle diameter of the metal silicon powder (metal silicon) is preferably from 2 to 20 μm. When the average particle diameter is smaller than 2 μm, an electric resistivity is excessively small sometimes. When the average particle diameter is larger than 20 μm, the electric resistivity is excessively large sometimes. The average particle diameters of the silicon carbide particles and metal silicon (metal silicon particles) are values measured by the laser diffraction method. The silicon carbide particles are fine particles of silicon carbide constituting the silicon carbide powder, and the metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when a total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as pores are formed after the firing, and examples of the pore former include graphite, starch, resin balloons, a water-absorbing resin, and silica gel. A content of the pore former is preferably from 0.1 to 15.0 parts by mass, when the total mass of the silicon carbide powder and the metal silicon powder is 100 parts by mass. An average particle diameter of the pore former is preferably from 10 to 30 µm.

Next, the outer periphery coating material prepared by the above method is preferably applied to the outer peripheral surface of the bonded assembly or the ground and processed bonded assembly. There is not any special restriction on an applying method, and the material can be applied, for example, by a spatula.

Next, an electrode member forming raw material to form electrode members is blended. When main components of the electrode members are silicon carbide and silicon, the electrode member forming raw material is preferably prepared by adding predetermined additives to silicon carbide powder and silicon powder, followed by the kneading.

Specifically, metal silicon powder (metal silicon), a binder, a surfactant, a pore former, water and the like are added to silicon carbide powder (silicon carbide) and kneaded to prepare the electrode member forming raw material. When a total mass of the silicon carbide powder and metal silicon is 100 parts by mass, the mass of metal silicon is preferably from 10 to 50 parts by mass. An average particle diameter of silicon carbide particles in the silicon carbide powder is preferably from 10 to 70 µm. An average particle diameter of the metal silicon powder (metal silicon) is preferably from 1 to 20 µm. When the average particle diameter is smaller than 1 µm, the volume resistivity is excessively small sometimes. When the average particle diameter is larger than 20 µm, the volume resistivity is excessively large sometimes. The average particle diameters of the silicon carbide particles and metal silicon (metal silicon particles) are values measured by the laser diffraction method. The silicon carbide particles are fine particles of silicon carbide constituting the silicon carbide powder, and the metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when a total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as pores are formed after the firing, and examples of the pore former include graphite, starch, resin balloons, a water-absorbing resin, and silica gel. A content of the pore former is preferably from 0.1 to 10 parts by mass, when the total mass of the silicon carbide powder and the metal silicon powder is 100 parts by mass. An average particle diameter of the pore former is preferably from 5 to 50 µm. When the average particle diameter is smaller than 5 µm, the pores cannot sufficiently be formed sometimes. When the average particle diameter is larger than 50 µm, large pores are easily formed, and hence strength deterioration occurs sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the paste-like electrode member forming raw material. There is not any special restriction on a kneading method and, for example, a vertical stirrer can be used.

Next, the obtained electrode member forming raw material is preferably applied to the surface of the precursor of the outer peripheral wall of the bonded assembly (the precursor obtained by drying the applied outer periphery coating material). There is not any special restriction on a method of applying the electrode member forming raw material to the surface of the precursor of the outer peripheral wall but, for example, a printing method can be used. Furthermore, the electrode member forming raw material is preferably applied to the side surface of the bonded assembly so as to obtain the above-mentioned shape and arrangement of the electrode members in the above honeycomb structure of the present invention.

Furthermore, a shape of a coating membrane is preferably determined so that the outer peripheral shape of each electrode member to be formed is a desirable shape, when the electrode member forming raw material is applied to the surface of the precursor of the outer peripheral wall (i.e., the side surface of the bonded assembly). For example, the coating membrane may have a shape in which at least one corner portion of a rectangular shape is formed into a curved shape, or a shape in which at least one corner portion of the rectangular shape is linearly chamfered in a preferable configuration.

A thickness of each electrode member can be set to a desirable thickness by regulating a thickness of the electrode member forming raw material during the application thereof. As described above, the electrode members can be formed simply by applying the electrode member forming raw material to the surface of the precursor of the outer peripheral wall, followed by the drying and the firing, and hence the electrode members can very easily be formed.

Next, "the bonded honeycomb segment assembly to which the electrode member forming raw material is applied" is preferably dried and fired to prepare the honeycomb structure of the present invention.

A drying condition at this time is preferably from 50 to 200° C.

Furthermore, prior to the firing, the calcinating is preferably performed to remove the binder and the like. The calcinating is preferably performed at 400 to 500° C. in the air atmosphere for 0.5 to 20 hours. There is not any special restriction on a calcinating and firing method, and the firing can be performed by using an electric furnace, a gas furnace or the like. As firing conditions, heating is preferably performed at 1400 to 1500° C. in an inert atmosphere of nitrogen, argon or the like for one to 20 hours. Furthermore, after the firing, for the enhancement of the durability, the oxygenation treatment is preferably performed at 1200 to 1350° C. for one to ten hours.

EXAMPLES

Hereinafter, examples of the present invention will further specifically be described, but the present invention is not limited to these examples.

Example 1

Silicon carbide (SiC) powder and metal silicon (Si) powder were mixed at a mass ratio of 80:20. Then, to this mixture, hydroxypropyl methylcellulose as a binder and a water-absorbing resin as a pore former were added, and water was also added to prepare a forming raw material. Then, the forming raw material was kneaded by a vacuum clay kneader to prepare a columnar kneaded material. A content of the binder was 7 parts by mass when a total of the silicon carbide (SiC) powder and the metal silicon (Si) powder was 100 parts by mass. A content of the pore former was 3 parts by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 20 µm, and an average particle diameter of the metal silicon powder was 6 µm. Furthermore, an average particle diameter of the pore former was 20 µm. The average particle diameters of silicon carbide, metal silicon and the pore former are values measured by a laser diffraction method.

The obtained columnar kneaded material was formed by using an extrusion-forming machine, to prepare nine honeycomb formed segment bodies. The obtained honeycomb formed segment bodies were dried by high frequency dielectric heating, and then dried at 120° C. for two hours by use of a hot air drier, and both end surfaces of each body were cut as much as a predetermined amount. It is to be noted that when honeycomb segments are prepared, the honeycomb segments are not fired.

Each obtained honeycomb segment had a square shape in which one side of each end surface was 35 mm, and a length of the honeycomb segment in a cell extending direction was 100 mm. Furthermore, a porosity of the honeycomb segment was 40%. A thickness of partition walls of the honeycomb segment was 101.6 µm, and a cell density was 93 cells/cm$^2$. The porosity is a value measured by a mercury porosimeter (Autopore IV 9505 manufactured by Micromeritics Co., Ltd.).

Next, a bonding material to bond the honeycomb segments was prepared. Specifically, silicon carbide (SiC) powder and metal silicon (Si) powder were mixed at a mass ratio of 65:35. Then, to this mixture, there were added strontium carbonate as a sintering auxiliary agent, hydroxypropyl methylcellulose as a binder, glycerin as a moisture retaining agent and a surfactant as a dispersant, and water was also added, followed by the mixing. The mixture was kneaded to obtain a bonding material. A content of the pore former was 3 parts by mass, when a total of the silicon carbide (SiC) powder and the metal silicon (Si) powder was 100 parts by mass. A content of strontium carbonate was 1 part by mass, when the total of the silicon carbide (SiC) powder and the metal silicon (Si) powder was 100 parts by mass. A content of the binder was 0.5 part by mass, when the total of the silicon carbide (SiC) powder and the metal silicon (Si) powder was 100 parts by mass. A content of glycerin was 10 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 52 µm, and an average particle diameter of the metal silicon powder was 6 µm. Furthermore, an average particle diameter of the pore former was 30 µm. The average particle diameters of silicon carbide, metal silicon and the pore former are values measured by the laser diffraction method. The kneading was performed by using a vertical stirrer.

The obtained bonding material was applied to the side surface of each honeycomb segment, and the nine honeycomb segments were bonded in a state where the segments were arranged in an arrangement of "three segments×three segments". "The state where the segments were arranged in the arrangement of "three segments×three segments"" was a state where the honeycomb segments were arranged in three vertical segments and three horizontal segments in an end surface of the bonded assembly in which the honeycomb segments were bonded. Additionally, in Example 1, a thickness of a bonding layer formed by the bonding material was 1 mm.

Next, as to a bonded honeycomb segment assembly in which the segments were bonded in a state where the segments were arranged in the arrangement of "three segments× three segments", an outer peripheral portion of the assembly was roughly processed, and ground and processed so that an end surface of the bonded assembly had a round shape with a diameter of 93 mm, to prepare a cylindrical bonded assembly.

Next, an outer periphery coating material to form an outer peripheral wall of the bonded honeycomb segment assembly was prepared as follows. First, silicon carbide (SiC) powder and metal silicon (Si) powder were mixed at a mass ratio of 80:20. Then, to this mixture, there were added hydroxypropyl methylcellulose as a binder and a water-absorbing resin as a pore former, and water was also added to obtain a forming raw material. Then, the forming raw material was kneaded by a vacuum clay kneader, to prepare a columnar kneaded material. A content of the binder was 7 parts by mass, when a total of the silicon carbide (SiC) powder and metal silicon (Si) was 100 parts by mass. A content of the water was 42 parts by mass, when the total of the silicon carbide (SiC) powder and the metal silicon (Si) powder was 100 parts by mass. An average particle diameter of the silicon carbide powder was 20 µm, and an average particle diameter of the metal silicon powder was 6 µm. Furthermore, an average particle diameter of the pore former was 20 µm. The average particle diameters of silicon carbide, metal silicon and the pore former are values measured by the laser diffraction method.

Next, the above outer periphery coating material was applied to an outer periphery of the cylindrical bonded assembly, to prepare a precursor of an outer peripheral wall, thereby obtaining a bonded honeycomb segment precursor. As a method of applying the outer periphery coating material, there was used a method of coating the outer peripheral portion of the bonded assembly with the outer periphery coating material in a uniform thickness (a thickness of 0.35 mm after the firing) by "a rubber spatula", while rotating the bonded assembly on a potter's wheel. The obtained bonded honeycomb segment precursor was dried. A drying temperature was 70° C.

Next, silicon carbide (SiC) powder and metal silicon (Si) powder were mixed at a mass ratio of 60:40. To this mixture, hydroxypropyl methylcellulose as a binder, glycerin as a moisture retaining agent and a surfactant as a dispersant were added, and water was also added, followed by the mixing. The mixture was kneaded to prepare an electrode member forming raw material. A content of the binder was 0.5 part by mass when the total of the silicon carbide (SiC) powder and the metal silicon (Si) powder was 100 parts by mass. A content of glycerin was 10 parts by mass when the total of the silicon carbide (SiC) powder and the metal silicon (Si) powder was 100 parts by mass. A content of the surfactant was 0.3 part by mass when the total of the silicon carbide (SiC) powder and the metal silicon (Si) powder was 100 parts by mass. A content of the water was 42 parts by mass when the total of the silicon carbide (SiC) powder and the metal silicon (Si) powder was 100 parts by mass. An average particle diameter of the silicon carbide powder was 52 μm, and an average particle diameter of the metal silicon powder was 6 μm. The average particle diameters of silicon carbide and metal silicon are values measured by the laser diffraction method. The kneading was performed by using a vertical stirrer.

Next, the electrode member forming raw material was applied to the side surface of the dried bonded honeycomb segment precursor in such a band-like manner so that a thickness (the thickness after the drying and the firing) was 1.0 mm and "an angle of 0.5 time a central angle in a cross section perpendicular to a cell extending direction was 49.3°". The electrode member forming raw materials were applied to two portions of the side surface of the dried bonded honeycomb segment precursor. Then, in the cross section perpendicular to the cell extending direction, one of the two portions to which the electrode member forming raw materials were applied was disposed on a side opposite to the other portion via a center of the honeycomb formed body. A shape (an outer peripheral shape) of the electrode section forming raw material applied to the side surface of the bonded honeycomb segment precursor was a rectangular shape. The electrode member forming raw material was applied in such a shape of the electrode member 21 of the honeycomb structure 100 as shown in FIG. 1 to FIG. 5 (a segment pattern "a pattern A").

Next, the electrode member forming raw material applied to the bonded honeycomb segment precursor was dried. A drying condition was 70° C.

Next, "the bonded honeycomb segment precursor to which the electrode member forming raw material was applied" was degreased, fired and further subjected to an oxidation treatment to obtain a honeycomb structure. Degreasing conditions were 550° C. and three hours. Firing conditions were an argon atmosphere, 1450° C. and two hours. Conditions of the oxidation treatment were 1300° C. and one hour. The firing was only performed on "the bonded honeycomb segment precursor to which the electrode member forming raw material was applied" (after the degreasing) (as described above, during the preparation of the honeycomb segments, the honeycomb segments were not fired).

In the obtained honeycomb structure, a porosity of the bonding layer was 60%, and a porosity of the outer peripheral wall was 82%. Moreover, an average particle diameter of silicon carbide included in the honeycomb structure was 20 μm. The average particle diameter of silicon carbide included in the honeycomb structure was obtained by the following method. That is, the average particle diameter was obtained from an image obtained by observing cross sections and surfaces of the honeycomb segments by a scanning electron microscope (SEM). Specifically, a sample for observing "the cross section" and "the surface" was first cut out from the honeycomb segment. As to the cross section of the honeycomb segment, concaves and convexes of the cross section were filled with a resin, the cross section was further polished, and a polished surface was observed. On the other hand, as to the surface of the honeycomb segment, the cut sample (the partition wall) was observed as it was. Then, the average particle diameter was obtained from all the particles observed in "the cross section" and "the surface". To analyze the image, image processing software (Image J manufactured by National Institute of Health (NIH) Co.) was used.

A volume resistivity of the honeycomb segments was 30 Ωcm, a volume resistivity of the bonding layer was 24 Ωcm, and a volume resistivity of the outer peripheral wall was 50 Ωcm. Furthermore, a volume resistivity of the electrode member was 0.8 Ωcm. Furthermore, the porosities of the bonding layer, the outer peripheral wall and the electrode members are values measured by a mercury porosimeter (Autopore IV 9505 manufactured by Micromeritics Co., Ltd.).

Furthermore, the volume resistivities of the honeycomb segments, the bonding layer, the outer peripheral wall and the electrode members were measured by the following method. A test piece of 10 mm×10 mm×50 mm was prepared by using the same material as in each measurement object. A silver paste was applied to the whole surfaces of both end portions of the test piece (both end portions in a longitudinal direction), so that it was possible to energize the test piece via a wiring line. The test piece was connected to a voltage applying current measuring device, and a voltage was applied to the test piece. A thermocouple was disposed in a central region of the test piece, and a change of a temperature of the test piece with an elapse of time during application of a voltage was confirmed by a recorder. A voltage of 100 to 200 V was applied, a current value and a voltage value were measured in a state where the test piece temperature was 400° C., and the volume resistivity was calculated from the obtained current value and voltage value and the test piece dimension.

Table 1 shows "a structure of the honeycomb structure", "a cell structure of the honeycomb segment", "a cell open frontal area ratio (OFA) of the honeycomb segment", "the volume resistivity (Ωcm) of the honeycomb segment", "the volume resistivity of the bonding layer" and "a value of "ρjo/Rjo"". It is to be noted that ρjo is the volume resistivity of the bonding layer. Rjo is a value (a converted volume resistivity (Ωcm)) calculated in accordance with a formula of "ρA/(1−OFA/100)". Furthermore, ρA is a volume resistivity (Ωcm) of the honeycomb segment.

Furthermore, as to the obtained honeycomb structure, by the following methods, there were measured "the lowest temperature of the bonded honeycomb segment assembly during 200 V energization" (the lowest temperature) and "the highest temperature of the bonded honeycomb segment assembly during the 200 V energization" (the highest temperature)" and further, "a heat shock resisting property test" was carried out. The results are shown in Table 1. In a column of "evaluation", "A" indicates the most excellent result, "B" indicates the next excellent result, and these two results pass. "C" is a failure.

(Highest Temperature)

The highest temperature of a honeycomb structure body was measured, when a voltage of 200 V was applied to the obtained honeycomb structure. When the highest temperature of the honeycomb structure is low, it is indicated that an unevenness of a temperature distribution in the honeycomb structure is inhibited. Additionally, when the highest temperature of the above honeycomb structure is 300° C. or less, it can be considered that the unevenness of the temperature distribution in the honeycomb structure is inhibited (a state where the temperature distribution is not uneven). Furthermore, when the highest temperature is 250° C. or less, it can be considered that the unevenness of the temperature distribution in the honeycomb structure is more suitably inhibited. The measurement of the highest temperature is performed as follows. The temperatures of the following portions of the bonded honeycomb segment assembly are measured. Each of the portions is a position in the cross section perpendicular to the cell extending direction. The measurement portions are "a position in contact with the end portion of the electrode member (the end portion in the peripheral direction)", "a position in contact with a center point of the electrode member in the peripheral direction" and "center points (two portions) from an end portion of one electrode member to "an end portion close to the other electrode member" in the outer peripheral portion of the bonded honeycomb segment assembly". A measurement position (a temperature measurement position) in a gas flow direction is the center.

(Lowest Temperature)

The lowest temperature of the honeycomb structure body was measured, when the voltage of 200 V was applied to the obtained honeycomb structure. When the lowest temperature of the honeycomb structure is high, it is indicated that the unevenness of the temperature distribution in the honeycomb structure is inhibited. Additionally, when the lowest temperature of the above honeycomb structure is 100° C. or more, it can be considered that the unevenness of the temperature distribution in the honeycomb structure is inhibited, and further, when the lowest temperature is 150° C. or more, it can be considered that the unevenness of the temperature distribution in the honeycomb structure is more suitably inhibited. The measurement of the lowest temperature is performed as follows. The temperatures of the following portions of the bonded honeycomb segment assembly are measured. Each of the portions is a position in the cross section perpendicular to the cell extending direction. The measurement portions are "the position in contact with the end portion of the electrode member (the end portion in the peripheral direction)", "the position in contact with the center point of the electrode member in the peripheral direction" and "the center points (two portions) from the end portion of the one electrode member to "the end portion close to the other electrode member" in the outer peripheral portion of the bonded honeycomb segment assembly". The measurement position (the temperature measurement position) in the gas flow direction is the center. It is to be noted that in the above measurement of "the highest temperature" and the measurement of "the lowest temperature", the highest temperature and the lowest temperature are measured from the same range of the measurement portions, and hence the measurements are performed in a series of operation.

(Heat Shock Resisting Property Test)

A heating cooling test (100 cycles) of the honeycomb structure was carried out by using "a propane gas burner testing machine" capable of supplying a heating gas into a metal case in which the honeycomb structure was contained "by use of a gas burner for burning a propane gas". Specifically, the obtained honeycomb structure was first contained (canned) in the metal case of the propane gas burner testing machine. Then, the gas heated by the gas burner was supplied into the metal case, so that the gas passed through the honeycomb structure. Temperature conditions (inlet gas temperature conditions) of the heating gas flowing into the metal case were as follows. First, a temperature was raised from 100° C. to 950° C. in five minutes, the temperature of 950° C. was held for ten minutes, the temperature was then cooled down to 100° C. in five minutes, and then the temperature of 100° C. was held for ten minutes. Afterward, there was repeated a heating cooling cycle "in which the temperature was raised from 100° C. to 950° C. in five minutes, 950° C. was held for ten minutes, the temperature was then cooled down to 100° C. in five minutes, and 100° C. was held for ten minutes" as much as 100 cycles. Afterward, the temperature was cooled down to room temperature, and a generation state of cracks in the honeycomb structure was confirmed. The test results of heat shock resisting properties are shown in a column of "cracks" of Table 1. "None" in the column of "the cracks" indicates that any cracks were not generated, and "present" therein indicates that the cracks were generated. "None" passes.

TABLE 1

| | | | Honeycomb segment | | | | |
| | | | Cell structure | | | Cell open | |
| | Structure of honeycomb structure | Segment pattern | Partition wall thickness (mm) | Cell density (cells/cm$^2$) | Cell shape | frontal area ratio (OFA) (%) | Volume resistivity (Ωcm) |
| --- | --- | --- | --- | --- | --- | --- | --- |
| Example 1 | Segment type | Pattern A | 0.10 | 93 | Square | 82 | 30 |
| Example 2 | Segment type | Pattern A | 0.13 | 93 | Square | 76 | 30 |
| Example 3 | Segment type | Pattern A | 0.15 | 93 | Square | 73 | 30 |
| Example 4 | Segment type | Pattern B | 0.15 | 93 | Square | 73 | 30 |
| Example 5 | Segment type | Pattern C | 0.15 | 93 | Square | 73 | 30 |
| Example 6 | Segment type | Pattern A | 0.10 | 93 | Square | 82 | 30 |
| Example 7 | Segment type | Pattern A | 0.10 | 93 | Square | 82 | 30 |
| Example 8 | Segment type | Pattern A | 0.10 | 93 | Square | 82 | 30 |
| Example 9 | Segment type | Pattern A | 0.10 | 93 | Square | 82 | 30 |
| Example 10 | Segment type | Pattern A | 0.10 | 93 | Square | 82 | 30 |
| Example 11 | Segment type | Pattern A | 0.10 | 93 | Square | 82 | 30 |
| Example 12 | Segment type | Pattern A | 0.13 | 93 | Square | 76 | 37 |
| Example 13 | Segment type | Pattern A | 0.15 | 93 | Hexagonal | 75 | 32 |
| Comparative Example 1 | Integral type | — | 0.10 | 93 | Square | 82 | 30 |
| Comparative Example 2 | Integral type | — | 0.13 | 93 | Square | 76 | 37 |
| Comparative Example 3 | Integral type | — | 0.15 | 93 | Hexagonal | 75 | 32 |
| Comparative Example 4 | Segment type | Pattern A | 0.10 | 93 | Square | 82 | 30 |
| Comparative Example 5 | Segment type | Pattern A | 0.10 | 93 | Square | 82 | 30 |
| Comparative Example 6 | Segment type | Pattern A | 0.13 | 93 | Square | 76 | 37 |
| Comparative Example 7 | Segment type | Pattern A | 0.13 | 93 | Square | 76 | 37 |
| Comparative Example 8 | Segment type | Pattern A | 0.15 | 93 | Hexagonal | 75 | 32 |

TABLE 1-continued

| | | | | | | | |
|---|---|---|---|---|---|---|---|
| Comparative Example 9 | Segment type | Pattern A | 0.15 | 93 | Hexagonal | 75 | 32 |

| | Bonding layer | | | | | | |
|---|---|---|---|---|---|---|---|
| | Volume resistivity (Ωcm) | ρjo/ Rjo | Lowest temp. (° C.) | Highest temp. (° C.) | Energization judgment | Cracks | Overall evaluation |
| Example 1 | 24 | 0.15 | 131 | 286 | B | None | B |
| Example 2 | 24 | 0.19 | 149 | 255 | B | None | B |
| Example 3 | 45 | 0.40 | 156 | 243 | A | None | A |
| Example 4 | 45 | 0.40 | 160 | 246 | A | None | A |
| Example 5 | 45 | 0.40 | 163 | 240 | A | None | A |
| Example 6 | 70 | 0.43 | 169 | 219 | A | None | A |
| Example 7 | 160 | 0.98 | 165 | 215 | A | None | A |
| Example 8 | 160 | 0.98 | 171 | 229 | A | None | A |
| Example 9 | 160 | 0.98 | 160 | 210 | A | None | A |
| Example 10 | 600 | 3.67 | 148 | 253 | B | None | B |
| Example 11 | 1100 | 6.73 | 110 | 285 | B | None | B |
| Example 12 | 160 | 1.02 | 167 | 228 | A | None | A |
| Example 13 | 160 | 1.26 | 169 | 244 | A | None | A |
| Comparative Example 1 | — | — | 170 | 230 | A | Present | C |
| Comparative Example 2 | — | — | 169 | 225 | A | Present | C |
| Comparative Example 3 | — | — | 175 | 235 | A | Present | C |
| Comparative Example 4 | 1.8 | 0.01 | 53 | 450 | C | None | C |
| Comparative Example 5 | 2011 | 12.31 | 51 | 380 | C | None | C |
| Comparative Example 6 | 1.8 | 0.01 | 48 | 430 | C | None | C |
| Comparative Example 7 | 2011 | 12.77 | 49 | 390 | C | None | C |
| Comparative Example 8 | 1.8 | 0.01 | 69 | 470 | C | None | C |
| Comparative Example 9 | 2011 | 15.78 | 70 | 420 | C | None | C |

TABLE 2

| | | Honeycomb segment | | | | | |
|---|---|---|---|---|---|---|---|
| | | Cell structure | | | Cell open | | |
| | Structure of honeycomb structure | Segment pattern | Partition wall thickness (mm) | Cell density (cells/cm$^2$) | Cell shape | frontal area ratio (OFA) (%) | Volume resistivity (Ωcm) | Resistance Ω |
| Example 7 | Segment type | Pattern A | 0.10 | 93 | Square | 82 | 30 | 25.9 |
| Example 14 | Segment type | Pattern A | 0.10 | 93 | Square | 82 | 30 | 25.9 |
| Example 15 | Segment type | Pattern B | 0.10 | 93 | Square | 82 | 30 | 100.0 |
| Example 16 | Segment type | Pattern C | 0.10 | 93 | Square | 82 | 30 | 20.0 |

| | Bonding layer | | | | | | | |
|---|---|---|---|---|---|---|---|---|
| | Volume resistivity (Ωcm) | ρjo/ Rjo | Resistance Ω | Lowest temp. (° C.) | Highest temp. (° C.) | Energization judgment | Cracks | Overall evaluation |
| Example 7 | 160 | 0.98 | 38.1 | 165 | 215 | A | None | A |
| Example 14 | 400 | 2.45 | 95.3 | 150 | 248 | A | None | A |
| Example 15 | 160 | 0.98 | 147.2 | 165 | 215 | A | None | A |
| Example 16 | 160 | 0.98 | 29.4 | 165 | 215 | A | None | A |

Examples 2 to 16 and Comparative Examples 4 to 9

The procedures of Example 1 were repeated except that respective conditions were changed as shown in Table 1, to prepare honeycomb structures. In the same manner as in Example 1, there were measured "the lowest temperature of a bonded honeycomb segment assembly during 200 V energization" (the lowest temperature) and "the highest temperature of the bonded honeycomb segment assembly during the 200 V energization" (the highest temperature) of each honeycomb structure and further, "a heat shock resisting property test" was carried out. Furthermore, as to Examples 7, 14, 15 and 16, resistance values (resistances) of honeycomb segments and bonding layers were measured. As to each resistance value, a voltage of 200 V was applied at 25° C. to measure a current value, and from the obtained current value and voltage, the resistance value was calculated. As to the resistance value of the bonding layer of each of the honeycomb structures of Examples 7 and 14, a resistance value between both end portions A and B in a both-end contact linear portion 7A shown in FIG. 2 was measured. Furthermore, the resistance value of each of the honeycomb segments of the honeycomb structures of Examples 7 and 14 was measured as follows. That is, on the same conditions as in the honeycomb segment, a honeycomb body having the same outer shape as in the bonded honeycomb segment assembly was prepared, and there was measured the resistance value at the same position as the above position "between both the end portions A and B in the both-end contact linear portion 7A shown in FIG. 2" in the honeycomb body. As to the resistance value of the bonding layer of the honeycomb structure of the Example 15, a resistance value between both end portions A and B in a one-end contact linear portion 7D shown in FIG. 7 was measured. Furthermore, the resistance value of each honeycomb segment of the honeycomb structure of Example 15 was measured as follows. That is, on the same conditions as in the honeycomb segment, a honeycomb body having the same outer shape as in the bonded honeycomb segment assembly was prepared, and there was measured the resistance value at the same position as the above position "between both the end portions A and B in the one-end contact linear portion 7D shown in FIG. 7" in the honeycomb body. As to the resistance value of the bonding layer of the honeycomb structure of Example 16, a resistance value between both end portions A and B in a non-contact vertical linear portion 7C shown in FIG. 6 was measured. Furthermore, the resistance value of each honeycomb segment of the honeycomb structure of Example 16 was measured as follows. That is, on the same conditions as in the honeycomb segment, a honeycomb body having the same outer shape as in the bonded honeycomb segment assembly was prepared, and there was measured the resistance value at the same position as the above position "between both the end portions A and B in the non-contact vertical linear portion 7C shown in FIG. 6" in the honeycomb body. The results are shown in Tables 1 and 2. "A cell shape" in Tables 1 and 2 is a shape of cells in a cross section perpendicular to an extending direction of the cells. It is to be noted that "a pattern A" of a column of a segment pattern indicates that the honeycomb structure has such a segment structure and electrode arrangement as shown in FIG. 1 to FIG. 5. Furthermore, "a pattern B" of the column of the segment pattern indicates that the honeycomb structure has such a segment structure and electrode arrangement as shown in FIG. 7. Furthermore, "a pattern C" of the column of the segment pattern indicates that the honeycomb structure has such a segment structure and electrode arrangement as shown in FIG. 6. Here, in Example 5 (the pattern C), each honeycomb segment had a rectangular shape with an end surface of 50 mm×35 mm. Furthermore, when side surfaces of the honeycomb segment were bonded to each other, eight honeycomb segments were bonded in a state where the segments were arranged in an arrangement of "four segments×two segments". Furthermore, as to a bonded honeycomb segment assembly in which the segments were bonded in a state where the segments were arranged in the arrangement of "four segments×two segments", an outer peripheral portion of the assembly was roughly processed, and ground and processed so that the end surface of the bonded assembly had a round shape with a diameter of 93 mm, to prepare the cylindrical bonded assembly.

Comparative Example 1

The procedures of Example 1 were repeated except that a honeycomb structure of an integral structure was prepared by using the same raw material as a raw material in preparation of each honeycomb segment in Example 1, to prepare the honeycomb structure. The honeycomb structure of the integral structure is a honeycomb structure constituted of one honeycomb segment (a size and a shape are different sometimes) in a honeycomb segment bonding type honeycomb structure. The honeycomb structure of the integral structure is constituted of one honeycomb segment, and hence does not have a bonding layer. In the honeycomb structure of Comparative Example 1, a partition wall thickness was 0.10 mm and a cell density was 93 cells/cm$^2$. Furthermore, a bottom surface of a honeycomb structure body had a round shape with a diameter of 93 mm, and a length of the honeycomb structure body in a cell extending direction was 100 mm. In the same manner as in Example 1, there were measured "the lowest temperature of a bonded honeycomb segment assembly during 200 V energization" (the lowest temperature) and "the highest temperature of the bonded honeycomb segment assembly during the 200 V energization" (the highest temperature) of the honeycomb structure and further, "a heat shock resisting property test" was carried out. The results are shown in Table 1.

Comparative Examples 2 and 3

The procedures of Comparative Example 1 were repeated except that respective conditions were changed as shown in Table 1, to prepare a honeycomb structure. In the same manner as in Example 1, there were measured "the lowest temperature of a bonded honeycomb segment assembly during 200 V energization" (the lowest temperature) and "the highest temperature of the bonded honeycomb segment assembly during the 200 V energization" (the highest temperature) of the honeycomb structure and further, "a heat shock resisting property test" was carried out. The results are shown in Table 1.

It is seen from Table 1 that the honeycomb structures of Examples 1 to 16 have excellent heat shock resisting properties. Further, it is seen from evaluations of "the highest temperature" and "the lowest temperature" that the honeycomb structures of Examples 3 to 9 have a state where an unevenness of a temperature distribution is inhibited. The honeycomb structures of Comparative Examples 1 to 3 had an integral structure (the structure was not a structure where segments were bonded), and hence generation of cracks was confirmed in measurement of heat shock resisting properties, so that the heat shock resisting properties were poor as compared with the honeycomb structures of Examples 1 to 16. The honeycomb structures of Comparative Examples 1 to 3 had suitable results concerning "energization", but in the heat shock resisting property test, the cracks as large problems for a catalyst carrier were generated, and hence an overall evaluation is "C". Furthermore, it is seen from the evaluations of "the highest temperature" and "the lowest temperature" that the honeycomb structures of Comparative Examples 4 to 9 have a state where an unevenness of a temperature distribution occurs.

A honeycomb structure of the present invention can suitably be utilized as a catalyst carrier for an exhaust gas purification device which purifies an exhaust gas of a car.

DESCRIPTION OF REFERENCE SYMBOLS

1: partition wall, 2: cell, 3: outer peripheral wall, 4: bonded honeycomb segment assembly, 5: side surface, 6: honeycomb segment, 7: bonding layer, 7A: both-end contact linear portion, 7B: non-contact transverse linear portion, 7C: non-contact vertical linear portion, 7D: one-end contact linear portion, 11: one end surface, 12: the other end surface, 21: electrode member, 100, 200 and 300: honeycomb structure, A: end portion, B: end portion, O: center, α: central angle, and θ: angle of 0.5 times the central angle.

What is claimed is:

1. A honeycomb structure comprising:
a tubular bonded honeycomb segment assembly having a plurality of tubular honeycomb segments having porous partition walls to define and form a plurality of cells which become through channels for a fluid and extend from one end surface to the other end surface, and also having a bonding layer which bonds side surfaces of the plurality of tubular honeycomb segments to each other; and a pair of electrode members disposed on a side surface of the tubular bonded honeycomb segment assembly,
wherein a volume resistivity of each of the tubular honeycomb segments of the tubular bonded honeycomb segment assembly is from 1 to 200 Ωcm, at least a part of the bonding layer is made of a bonding material having conductivity,
a volume resistivity of the bonding layer having conductivity is from 2 to 2000 Ωcm, and
each of the pair of electrode members is formed into a band-like shape extending in an extending direction of the plurality of cells of the tubular bonded honeycomb segment assembly, and in a cross section perpendicular to the cell extending direction, one electrode member in the pair of electrode members is disposed on a side opposite to the other electrode member in the pair of electrode members via a center of the tubular bonded honeycomb segment assembly.

2. The honeycomb structure according to claim 1,
wherein when the volume resistivity of the bonding layer having the conductivity is ρjo, an open frontal area ratio of the tubular honeycomb segment is OFA, the volume resistivity of the tubular honeycomb segment is ρA and a numeric value calculated in accordance with a formula of ρA/(1−OFA/100) is Rjo, a value of ρjo/Rjo as a value of a ratio of the ρjo to the Rjo is from 0.2 to 3.0.

3. The honeycomb structure according to claim 1, wherein a porosity of the bonding layer is from 30 to 70%.

4. The honeycomb structure according to claim 2, wherein a porosity of the bonding layer is from 30 to 70%.

5. The honeycomb structure according to claim 1,
wherein in the cross section perpendicular to the cell extending direction, the bonding layer has a both-end contact linear portion as a linear portion in which one end portion comes in contact with the one electrode member and the other end portion comes in contact with the other electrode member, and
a resistance value between the one end portion and the other end portion in the both-end contact linear portion is larger than a resistance value of the tubular honeycomb segment.

6. The honeycomb structure according to claim 2,
wherein in the cross section perpendicular to the cell extending direction, the bonding layer has a both-end contact linear portion as a linear portion in which one end portion comes in contact with the one electrode member and the other end portion comes in contact with the other electrode member, and
a resistance value between the one end portion and the other end portion in the both-end contact linear portion is larger than a resistance value of the tubular honeycomb segment.

7. The honeycomb structure according to claim 3,
wherein in the cross section perpendicular to the cell extending direction, the bonding layer has a both-end contact linear portion as a linear portion in which one end portion comes in contact with the one electrode member and the other end portion comes in contact with the other electrode member, and
a resistance value between the one end portion and the other end portion in the both-end contact linear portion is larger than a resistance value of the tubular honeycomb segment.

8. The honeycomb structure according to claim 4,
wherein in the cross section perpendicular to the cell extending direction, the bonding layer has a both-end contact linear portion as a linear portion in which one end portion comes in contact with the one electrode member and the other end portion comes in contact with the other electrode member, and
a resistance value between the one end portion and the other end portion in the both-end contact linear portion is larger than a resistance value of the tubular honeycomb segment.

9. The honeycomb structure according to claim 1,
wherein in the cross section perpendicular to the cell extending direction, the bonding layer has a one-end contact linear portion as a linear portion in which both end portions are positioned in an outer periphery of the tubular bonded honeycomb segment assembly and only one end portion comes in contact with the electrode member, and
a resistance value between the one end portion and the other end portion in the one-end contact linear portion is larger than a resistance value of the tubular honeycomb segment.

10. The honeycomb structure according to claim 1,
wherein in the cross section perpendicular to the cell extending direction, the bonding layer has a non-contact vertical linear portion as a linear portion in which both end portions are positioned in an outer periphery of the tubular bonded honeycomb segment assembly and do not come in contact with the electrode members and which does not intersect with a line segment connecting centers of the pair of electrode members to each other, and
a resistance value between the one end portion and the other end portion in the non-contact vertical linear portion is larger than a resistance value of the tubular honeycomb segment.

11. The honeycomb structure according to claim 1,
wherein in the cross section perpendicular to the cell extending direction, the bonding layer has a non-contact transverse linear portion as a linear portion in which both end portions are positioned in an outer periphery of the tubular bonded honeycomb segment assembly and do not come in contact with the electrode members and which intersects with a line segment connecting centers of the pair of electrode members to each other, and a resistance value between the one end portion and the other end portion in the non-contact transverse linear portion is smaller than a resistance value of the tubular honeycomb segment.

12. The honeycomb structure according to claim 1, wherein a material of the tubular honeycomb segment contains a silicon-silicon carbide composite material as a main component, an average particle diameter of silicon carbide in the tubular honeycomb segment is from 3 to 50 μm, a porosity of the porous partition walls of the tubular honeycomb segment is from 35 to 60%, and a content ratio of silicon in the tubular honeycomb segment is from 10 to 40 mass % of a total mass of silicon and silicon carbide in the tubular honeycomb segment.

* * * * *